US011645634B2

(12) United States Patent
Yan

(10) Patent No.: US 11,645,634 B2
(45) Date of Patent: May 9, 2023

(54) BLOCKCHAIN-BASED SUPPLY CHAIN PAYMENT NETWORK

(71) Applicant: TraDove, Inc., Palo Alto, CA (US)

(72) Inventor: Jun Yan, Palo Alto, CA (US)

(73) Assignee: TraDove, Inc., Palo Alto, CA (US)

( * ) Notice: Subject to any disclaimer, the term of this patent is extended or adjusted under 35 U.S.C. 154(b) by 0 days.

(21) Appl. No.: 16/950,463

(22) Filed: Nov. 17, 2020

(65) Prior Publication Data

US 2022/0156727 A1 May 19, 2022

Related U.S. Application Data

(60) Provisional application No. 63/114,459, filed on Nov. 16, 2020.

(51) Int. Cl.
*G06Q 20/38* (2012.01)
*G06Q 20/06* (2012.01)
(Continued)

(52) U.S. Cl.
CPC ........... *G06Q 20/381* (2013.01); *G06F 16/27* (2019.01); *G06F 16/28* (2019.01);
(Continued)

(58) Field of Classification Search
CPC ............. G06Q 20/381; G06Q 20/3678; G06Q 20/065; G06Q 20/389; G06Q 2220/00; G06Q 10/06315; G06Q 20/3821; G06Q 30/0633; G06F 16/27; G06F 16/28; H04L 9/0825; H04L 2209/56
See application file for complete search history.

(56) References Cited

U.S. PATENT DOCUMENTS

2005/0027639 A1* 2/2005 Wong ..................... G06Q 40/00
705/37
2020/0042989 A1 2/2020 Ramadoss et al.
(Continued)

FOREIGN PATENT DOCUMENTS

CN    112003940 A  * 11/2020  ............. G06Q 20/30

OTHER PUBLICATIONS

International Search Report and Written Opinion, dated Dec. 17, 2021, regarding International Application No. PCT/US2021/059329, 10 pages.

*Primary Examiner* — Patrick McAtee
*Assistant Examiner* — Vincent I Idiake
(74) *Attorney, Agent, or Firm* — Sheppard Mullin Richter & Hampton LLP

(57) ABSTRACT

Systems and methods are provided for minting payment tokens to conduct transactions within a blockchain-based supply chain payment network. The payment tokens can be pegged to fiat currency or digital currency. The payment tokens can be minted by a computing system that is a node in the blockchain-based supply chain payment network. A number of payment tokens to be provided to a network participant as payment can be determined. The network participant can be a supplier associated with the blockchain-based supply chain payment network. The number of payment tokens can be provided for deposit in a digital wallet associated with the network participant as payment. The cryptocurrency tokens can be redeemed as fiat or digital currency.

30 Claims, 12 Drawing Sheets

(51) Int. Cl.
  *G06Q 20/36* (2012.01)
  *G06Q 10/06* (2012.01)
  *G06Q 30/06* (2012.01)
  *H04L 9/08* (2006.01)
  *G06F 16/27* (2019.01)
  *G06F 16/28* (2019.01)
  *G06Q 10/0631* (2023.01)
  *G06Q 30/0601* (2023.01)

(52) U.S. Cl.
  CPC ..... *G06Q 10/06315* (2013.01); *G06Q 20/065* (2013.01); *G06Q 20/3678* (2013.01); *G06Q 20/389* (2013.01); *G06Q 20/3821* (2013.01); *G06Q 30/0633* (2013.01); *H04L 9/0825* (2013.01); *G06Q 2220/00* (2013.01); *H04L 2209/56* (2013.01)

(56) References Cited

U.S. PATENT DOCUMENTS

2020/0302433 A1\* 9/2020 Green .................. G06Q 20/3676
2021/0056520 A1\* 2/2021 Thomsen ............. G06Q 20/027

\* cited by examiner

BLOCKCHAIN-BASED SUPPLY CHAIN PAYMENT NETWORK

CROSS-REFERENCE TO RELATED APPLICATION

This application claims the benefit under 35 U.S.C. 119(e) of U.S. Provisional Application No. 63/114,459, filed on Nov. 16, 2020, the content of which is hereby incorporated in its entirety.

FIELD OF THE INVENTION

This disclosure relates to the use of blockchain technology to support a supply chain payment network.

BACKGROUND

A blockchain network is generally comprised of nodes (e.g., computing systems) that collaboratively manage a distributed database (e.g., a decentralized digital ledger). The decentralized digital ledger can be used to record various transactions that occur between network participants in a verifiable manner. For example, nodes in a blockchain network can record payment transactions in blocks that are successively linked together using cryptography to form a blockchain. Typically, each block in the blockchain includes a cryptographic hash of a preceding block in the blockchain. The blockchain can continually be updated and distributed to nodes in the blockchain network. In general, the blockchain improves transparency while ensuring data immutability subject to consensus protocols.

SUMMARY

Various embodiments of the present disclosure can include systems, methods, and non-transitory computer readable media configured to mint payment tokens to conduct transactions within a blockchain-based supply chain payment network. The payment tokens can be pegged to fiat currency or digital currency. The payment tokens can be minted by a computing system that is a node in the blockchain-based supply chain payment network. A number of payment tokens to be provided to a network participant as payment can be determined. The network participant can be a supplier associated with the blockchain-based supply chain payment network. The number of payment tokens can be provided for deposit in a digital wallet associated with the network participant as payment. The cryptocurrency tokens can be redeemed as fiat or digital currency.

In an embodiment, the systems, methods, and non-transitory computer readable media are configured to perform determining a request from the network participant to convert one or more payment tokens to fiat or digital currency; providing instructions to a computing system associated with a financial institution to convert the one or more payment tokens to fiat or digital currency; and causing the one or more payment tokens to be burned.

In an embodiment, the systems, methods, and non-transitory computer readable media are configured to generate a data record that represents a transaction based on the deposit of payment tokens to the digital wallet associated with the network participant, wherein the data record is posted to a blockchain associated with the blockchain-based supply chain payment network.

In an embodiment, the systems, methods, and non-transitory computer readable media are configured to generate a supply chain report based on one or more queries to a blockchain associated with the blockchain-based supply chain payment network, wherein the supply chain report includes transaction information for at least one transaction recorded in the blockchain.

In an embodiment, the systems, methods, and non-transitory computer readable media are configured to determine one or more network participants involved in at least one transaction in the blockchain-based supply chain payment network that are included in a non-compliance exclusion list based on the supply chain report.

In an embodiment, the number of payment tokens to be provided to the network participant is determined based on a smart contract.

In an embodiment, the number of payment tokens are provided for deposit automatically in response to satisfaction of a set of conditions associated with the smart contract.

In an embodiment, the blockchain-based supply chain payment network comprises a plurality of nodes which can include at least one node controlled by a supplier associated with the blockchain-based supply chain payment network.

In an embodiment, the systems, methods, and non-transitory computer readable media are configured to store a blockchain associated with the blockchain-based supply chain payment network, wherein the blockchain is a distributed database that includes a plurality of data records that represent transactions in the blockchain-based supply chain payment network.

In an embodiment, the transactions are between a company and one or more suppliers in the blockchain-based supply chain payment network or between a supplier and another supplier in the blockchain-based supply chain payment network.

In an embodiment, the blockchain-based supply chain payment network comprises a plurality of nodes including at least one node that corresponds to a T-Node associated with a supplier, and wherein the T-Node is also a processing node that can be associated with a different blockchain-based supply chain payment network.

In an embodiment, the supplier is permitted to contribute additional T-Nodes to the blockchain-based supply chain payment network or the different blockchain-based supply chain payment network, and the supplier is permitted to remove T-Nodes associated with the supplier from the blockchain-based supply chain payment network or the different blockchain-based supply chain payment network.

In an embodiment, a computing device associated with a network participant of the blockchain-based supply chain payment network runs a digital wallet application that manages payment tokens associated with the blockchain-based supply chain payment network and/or payment tokens associated at least one different blockchain-based supply chain payment network.

In an embodiment, a network participant associated with a company is permitted to trace transactions that occur between the company and one or more suppliers through the blockchain-based supply chain payment work based on one or more privacy restrictions, and a network participant associated with an upstream supplier is permitted to trace transactions related to the upstream supplier that occur between downstream suppliers through the blockchain-based supply chain payment work based on one or more privacy restrictions.

Various embodiments of the present disclosure can include systems, methods, and non-transitory computer readable media configured to host a blockchain associated with at least a first blockchain-based supply chain payment network and a second blockchain-based supply chain payment network. The blockchain can be a distributed database that includes a plurality of data records that represent transactions in the first blockchain-based supply chain payment network and transactions in the second blockchain-based supply chain payment network. A transaction between network participants associated with the first blockchain-based supply chain payment network can be determined. The transaction can be based on payment tokens minted for circulation in the first blockchain-based supply chain payment network. A data record that represents the transaction between the network participants associated with the first blockchain-based supply chain payment network can be verified. The data record can be posted to the blockchain associated with the first blockchain-based supply chain payment network and the second blockchain-based supply chain payment network.

In an embodiment, the transaction is between a company and a supplier in the first blockchain-based supply chain payment network or between a supplier and another supplier in the first blockchain-based supply chain payment network.

In an embodiment, the systems, methods, and non-transitory computer readable media are configured to perform determining a transaction between network participants associated with the second blockchain-based supply chain payment network, wherein the transaction is based on payment tokens minted for circulation in the second blockchain-based supply chain payment network; and verifying a data record that represents the transaction between the network participants associated with the second blockchain-based supply chain payment network, wherein the data record is posted to the blockchain associated with the first blockchain-based supply chain payment network and the second blockchain-based supply chain payment network.

In an embodiment, the transaction is between a company and a supplier in the second blockchain-based supply chain payment network or between a supplier and another supplier in the second blockchain-based supply chain payment network.

In an embodiment, the computing system is a node in a hosted blockchain network that supports at least the first blockchain-based supply chain payment network and the second blockchain-based supply chain payment network.

In an embodiment, the hosted blockchain network manages the blockchain associated with at least the first blockchain-based supply chain payment network and the second blockchain-based supply chain payment network as a private blockchain, and wherein transactions posted in the private blockchain are not visible to network participants in the first blockchain-based supply chain payment network and the second blockchain-based supply chain payment network.

In an embodiment, the systems, methods, and non-transitory computer readable media are configured to perform determining a request from a network participant associated with the first blockchain-based supply chain payment network to convert one or more payment tokens minted for circulation in the first blockchain-based supply chain payment network to fiat or digital currency; and providing instructions to a computing system of a financial institution associated with the first blockchain-based supply chain payment network to convert the one or more payment tokens to fiat or digital currency, wherein the one or more payment tokens are burned after conversion.

In an embodiment, the systems, methods, and non-transitory computer readable media are configured to perform determining a request from a network participant associated with the second blockchain-based supply chain payment network to convert one or more payment tokens minted for circulation in the second blockchain-based supply chain payment network to fiat or digital currency; and providing instructions to a computing system of a financial institution associated with the second blockchain-based supply chain payment network to convert the one or more payment tokens to fiat or digital currency, wherein the one or more payment tokens are burned after conversion.

In an embodiment, the systems, methods, and non-transitory computer readable media are configured to generate a first supply chain report for the first blockchain-based supply chain payment network based on one or more queries to the blockchain, wherein the supply chain report provides transaction information for at least one transaction recorded in the blockchain for the first blockchain-based supply chain payment network.

In an embodiment, the systems, methods, and non-transitory computer readable media are configured to generate a second supply chain report for the second blockchain-based supply chain payment network based on one or more queries to the blockchain, wherein the supply chain report provides transaction information for at least one transaction recorded in the blockchain for the second blockchain-based supply chain payment network.

In an embodiment, a network participant associated with a company is permitted to trace transactions that occur between the company and one or more suppliers through the blockchain-based supply chain payment work based on one or more privacy restrictions, and a network participant associated with an upstream supplier is permitted to trace transactions related to the upstream supplier that occur between downstream suppliers through the blockchain-based supply chain payment work based on one or more privacy restrictions.

Various embodiments of the present disclosure can include systems, methods, and non-transitory computer readable media configured to determine a first blockchain-based supply chain payment network to be hosted. The first blockchain-based supply chain payment network can be associated with a first blockchain. A second blockchain-based supply chain payment network to be hosted can be determined. The second blockchain-based supply chain payment network can be associated with a second blockchain. At least one first virtual machine can be initialized to serve as a node in the first blockchain-based supply chain payment network. At least one second virtual machine can be initialized to serve as a node in the second blockchain-based supply chain payment network.

In an embodiment, the first blockchain is a distributed database that includes a plurality of data records that represent transactions based on payment tokens minted for circulation in the first blockchain-based supply chain payment network.

In an embodiment, the transactions are between a company and one or more suppliers in the first blockchain-based supply chain payment network or between a supplier and another supplier in the first blockchain-based supply chain payment network.

In an embodiment, the at least one first virtual machine implements a blockchain protocol that is different from a blockchain protocol implemented by the at least one second virtual machine.

In an embodiment, the second blockchain is a distributed database that includes a plurality of data records that represent transactions based on payment tokens minted for circulation in the second blockchain-based supply chain payment network.

In an embodiment, at least one data record is posted or verified by the at least one first virtual machine that serves as a node in the second blockchain-based supply chain payment network.

In an embodiment, the systems, methods, and non-transitory computer readable media are configured to perform accessing a supply chain report that describes a plurality of transactions in the first blockchain-based supply chain payment network, wherein the supply chain report is generated by the at least one first virtual machine that serves as a node in the first blockchain-based supply chain payment network.

In an embodiment, the supply chain report includes information describing at least one transaction, wherein the information includes at least a transaction date, sender address, destination address, and/or transaction amount.

In an embodiment, the systems, methods, and non-transitory computer readable media are configured to perform determining a need for an additional virtual machine to support the first or second blockchain-based supply chain payment network; and initializing at least one additional virtual machine to serve as a node in the first or second blockchain-based supply chain payment network.

In an embodiment, the systems, methods, and non-transitory computer readable media are configured to deactivate the at least one first virtual machine, wherein, upon deactivation, the at least one first virtual machine ceases to serve as a node in the first blockchain-based supply chain payment network.

In an embodiment, the systems, methods, and non-transitory computer readable media are configured to deactivate the at least one second virtual machine, wherein, upon deactivation, the at least one second virtual machine ceases to serve as a node in the second blockchain-based supply chain payment network.

In an embodiment, a computing device associated with a network participant of the first blockchain-based supply chain payment network runs a digital wallet application that manages payment tokens associated with the first blockchain-based supply chain payment network and payment tokens associated at least one different blockchain-based supply chain payment network.

In an embodiment, a network participant associated with a company is permitted to trace transactions that occur between the company and one or more suppliers through the blockchain-based supply chain payment work based on one or more privacy restrictions, and a network participant associated with an upstream supplier is permitted to trace transactions related to the upstream supplier that occur between downstream suppliers through the blockchain-based supply chain payment work based on one or more privacy restrictions.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1A:
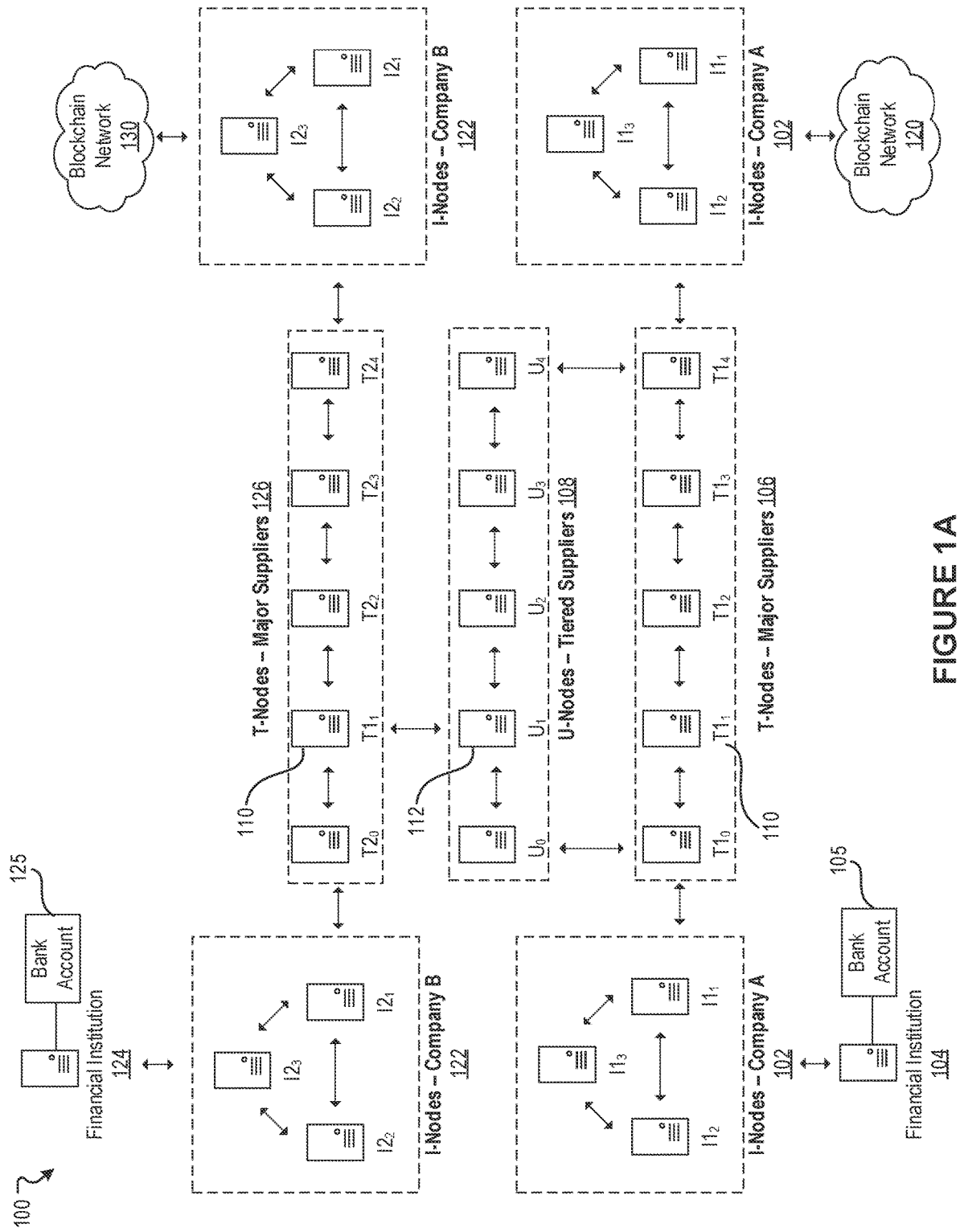
FIG. 1A illustrates an example system for implementing blockchain-based supply chain payment networks, in accordance with various embodiments of the present technology.

A blockchain payment network is generally comprised of nodes (e.g., computing systems) that collaboratively manage a distributed database (e.g., a decentralized digital ledger). The decentralized digital ledger can be used to record various transactions that occur between network participants in a verifiable manner. For example, nodes in a blockchain network can record payment transactions in blocks that are successively linked together using cryptography to form a blockchain. Typically, each block in the blockchain includes a cryptographic hash of a preceding block in the blockchain. The blockchain can continually be updated and distributed to nodes in the blockchain network. In general, the blockchain improves transparency while ensuring data immutability subject to consensus protocols.

Under conventional approaches, a company relies on fiat currency to pay suppliers in its supply chain. For instance, the company can initiate a payment to a Tier 1 supplier based on a transfer of fiat currency from the company (or a financial institution) to the Tier 1 supplier. The Tier 1 supplier can initiate payments to its Tier 2 suppliers based on fiat currency. Similarly, a Tier 2 supplier can initiate payments to its Tier 3 suppliers based on fiat currency, and so on. Conventional approaches thus depend on fiat currency to support a supply chain payment network. However, reliance on fiat currencies to support a supply chain payment network comes with disadvantages. For example, a company that relies on fiat currency to support its supply chain payment network can experience reduced cash flow. The reliance of fiat currency can also limit the company's visibility in its supply chain. That is, the company is typically able to see transactions involving the company and its Tier 1 suppliers. However, the company is typically unable to see transactions that occur between its Tier 1 suppliers and Tier 2 suppliers, between Tier 2 suppliers and Tier 3 suppliers, and so on. In another example, a company and its suppliers can experience increased transaction costs that are typically associated with fiat currency.

A claimed solution rooted in computer technology overcomes problems specifically arising in the realm of computer technology. In various embodiments, an entity (e.g., a company) and its suppliers can conduct transactions through a blockchain-based supply chain payment network. For example, the company can mint cryptocurrency (or payment tokens) that can be used to conduct transactions within the blockchain-based supply chain payment network. The tokens can be pegged to fiat currency (e.g., U.S. dollars) that is deposited in an account through a financial institution. The amount of fiat currency to which the tokens are pegged can be deposited in full or in part, for example, based on a redeemable fiat currency requirement. In this example, the company can initiate payments to its Tier 1 suppliers based on its minted tokens. These payment transactions can be recorded in a blockchain associated with the supply chain payment network. Tier 1 suppliers can similarly initiate payments to other suppliers (e.g., Tier 2 suppliers) based on tokens received from the company. These payment transactions can similarly be recorded in the blockchain associated with the supply chain payment network. Suppliers in the supply chain network can continue initiating token-based payments to other suppliers as needed. For example, Tier 2 suppliers can pay Tier 3 suppliers. In various embodiments, suppliers have the option to redeem (or cash out) tokens. For example, a Tier 3 supplier that received a token-based payment can initiate an option to exchange the tokens for fiat or digital currency. For example, in an embodiment, the Tier 3 supplier can transfer the tokens to the company in exchange for fiat or digital currency. In another embodiment, the Tier 3 supplier can transfer the tokens to a financial institution associated with the company in exchange for fiat or digital currency. Many variations are possible.

It can be especially advantageous for an entity (e.g., company) to conduct supply chain transactions based on cryptocurrency tokens instead of fiat currency. For example, the company can increase its cash flow by enabling supply chain transactions based on a fiat-backed cryptocurrency tokens. As another advantage, the company and its suppliers can implement smart contracts to programmatically conduct supply chain transactions upon satisfaction of events or conditions. Smart contracts can also be implemented to track and trace payments made in relation to supply chain transactions for various purposes, such as supply chain compliance. In another advantage, the company and its suppliers can conduct transactions with reduced transaction cost. In some instances, the company and its suppliers can delay tax payments on funds received as long as the funds are not converted from cryptocurrency tokens (or payment tokens) to fiat currency. As another advantage, the financial institution at which fiat currency pegged to the cryptocurrency tokens are redeemed can establish relationships with the company's suppliers. For example, a supplier can interact with the financial institution to exchange tokens to fiat or digital currency. In this example, the financial institution can seek to establish a banking relationship with the supplier. As yet another advantage, the company can gain increased transparency into its supply chain which would not be feasible under conventional approaches. That is, in some embodiments, any upstream company in the supply chain can trace payments made to or by downstream companies (or suppliers). For example, the company can access transactions recorded in the blockchain to generate supply chain reports that detail transactions between entities including transactions that occur downstream between different tiers of suppliers. As a result, the company is able to trace payments throughout its supply chain. In some embodiments, the company can utilize such supply chain reports to ensure its supply chain is in compliance with applicable laws and standards. For example, the company can easily reference its supply chain report to identify suppliers in its supply chain that are included in a list of non-compliant entities (e.g., entity exclusion list). In another example, the company can reference its supply chain report to identify downstream suppliers associated with a foodborne illness. In yet another example, the company can reference its supply chain report to identify downstream suppliers that are known to produce counterfeit products. Once offending suppliers are identified, the company can take action to remove or replace such suppliers from its supply chain. More details describing the present technology are provided below.

FIG. 1A illustrates a system 100 for implementing blockchain-based supply chain payment networks. The system 100 can include I-Nodes 102 controlled by an entity (e.g., "Company A"), a financial institution 104, T-Nodes 106 controlled by Company A and its major suppliers in a supply chain network associated with Company A, and U-nodes 108 controlled by suppliers in the supply chain network associated with Company A. For example, an I-Node 102 can implement an I-Node module 404, as described in reference to FIG. 4. A T-Node 106 can implement a T-Node module 504, as described in reference to FIG. 5. Further, a U-Node 108 can implement a U-Node module 604, as described in reference to FIG. 6. In some embodiments, the !-Nodes 102, T-Nodes 106, and U-Nodes 108 can participate as nodes in a blockchain network 120. In some embodiments, the I-Nodes 102 and T-Nodes 106 can participate as nodes in the blockchain network 120 while the U-Nodes 108 operate as digital wallets. In some embodiments, the T-Nodes 106 can include at least one node associated with Company A, at least one node associated with a Tier 1 supplier for Company A, at least one node associated with a Tier 2 supplier for Company A, at least one node associated with a Tier 3 supplier for Company A, and so on. In some embodiments, a computing system associated with the financial institution 104 can implement a digital wallet that facilitates the transfer of tokens from tiered suppliers (e.g., U-Nodes 108) to the financial institution 104. In some embodiments, a computing system associated with the financial institution 104 can implement a U-Node module 604, as described in reference to FIG. 6. Many variations are possible. For example, in some embodiments, a computing system associated with the financial institution 104 can implement an I-Node module 404, as described in reference to FIG. 4.

The blockchain network 120 can be associated with a blockchain based on a protocol. The blockchain can be used to record transactions that occur in the supply chain payment network associated with Company A. For example, the blockchain associated with the blockchain network 120 can be a "private" blockchain that is restricted to Company A and suppliers in its supply chain. In another example, the blockchain associated with the blockchain network 120 can be a consortium blockchain that is restricted to Company A and suppliers in its supply chain. In some embodiments, the I-Nodes 102 and T-Nodes 106 can be configured to post blockchain transactions to the blockchain associated with the blockchain network 120. The I-Nodes 102 and T-Nodes 106 can also be configured to validate transactions posted to the blockchain. In general, transactions posted to the blockchain can be validated using generally known techniques including, for example, proof of work calculations and confirmations, proof of stake calculations and confirmations, proof of authority calculations and confirmations, proof of history calculations and confirmations, proof of two calculations and confirmations, and proof of N calculations and confirmations, to name some examples.

The system 100 can also include I-Nodes 122 controlled by another entity (e.g., "Company B"), a financial institution 124, T-Nodes 126 controlled by Company B and its major suppliers in a supply chain network associated with Company B, and U-nodes 108 controlled by other suppliers in the supply chain network associated with Company B. For example, an I-Node 122 can implement an I-Node module 404, as described in reference to FIG. 4. A T-Node 126 can implement a T-Node module 504, as described in reference to FIG. 5. In some embodiments, the I-Nodes 122, T-Nodes 126, and U-Nodes 108 can participate as nodes in a blockchain network 130. In some embodiments, the I-Nodes 122 and T-Nodes 126 can participate as nodes in the blockchain network 130 while the U-Nodes 108 operate as digital wallets. In some embodiments, the T-Nodes 126 can include at least one node associated with Company B, at least one node associated with a Tier 1 supplier for Company B, at least one node associated with a Tier 2 supplier for Company B, at least one node associated with a Tier 3 supplier for Company B, and so on. In some embodiments, a computing system associated with the financial institution 124 can implement a digital wallet that facilitates the transfer of tokens from tiered suppliers (e.g., U-Nodes 108) to the financial institution 124. In some embodiments, a computing system associated with the financial institution 124 can implement a U-Node module 604, as described in reference to FIG. 6. Many variations are possible. For example, in some embodiments, a computing system associated with the financial institution 124 can implement an I-Node module 404, as described in reference to FIG. 4.

The blockchain network 130 can be associated with a different blockchain based on a different protocol. The blockchain can be used to record transactions that occur in the supply chain network associated with Company B. For example, the blockchain associated with the blockchain network 130 can be a "private" blockchain that is restricted to Company B and suppliers in its supply chain. In another example, the blockchain associated with the blockchain network 130 can be a consortium blockchain that is restricted to Company B and suppliers in its supply chain. In some embodiments, the I-Nodes 122 and T-Nodes 126 can be configured to post blockchain transactions to the blockchain associated with the blockchain network 130. The I-Nodes 122 and T-Nodes 126 can also be configured to validate transactions posted to the blockchain. In general, transactions posted to the blockchain can be validated using generally known techniques including, for example, proof of work calculations and confirmations, proof of stake calculations and confirmations, proof of authority calculations and confirmations, proof of history calculations and confirmations, proof of two calculations and confirmations, and proof of N calculations and confirmations, to name some examples.

The I-Nodes 102 and the T-Nodes 106 can be configured to manage a blockchain-based supply chain payment network for Company A. For example, the !-Nodes 102 can be configured to mint and burn cryptocurrency tokens as needed to support the blockchain-based supply chain payment network. In some embodiments, the minted tokens are stablecoins pegged to a fiat currency. For example, a single token can be pegged to a single U.S. dollar. Thus, when minting tokens under such embodiments, Company A can cause some amount of fiat currency to be deposited in a bank account 105 associated with the financial institution 104. The amount deposited can be consistent with an amount of tokens to be minted. For example, Company A can deposit $100 to mint 100 tokens. However, as mentioned, Company A can also deposit a lesser amount of fiat currency to mint the tokens. For example, Company A may only deposit an amount of fiat currency that is payable at any given time, such as $60 to mint 100 tokens. Once deposited, the I-Nodes 102 can be instructed to mint tokens. The !-Nodes 102 can also be instructed to transact with suppliers based on the minted tokens. For example, an I-Node 102 can be instructed to initiate a payment of 70 tokens to a Tier 1 supplier ("Supplier A"). The I-Node 102 can be configured to generate a data record reflecting the transaction. The data record can correspond to a blockchain transaction to be posted to the blockchain associated with the blockchain network 120. The data record may include various details describing the transaction, such a transaction description (e.g., transaction date, sender address, destination address, transaction amount), entity information (e.g., entity name, wallet address, etc.), among other information. The data record may then be posted to the blockchain. For example, the data record may be posted by the I-Node 102. The data record may be subsequently verified by one or more nodes included in the blockchain network 120, such as the T-Nodes 106. The data record may then be a part of the blockchain associated with the blockchain network 120. Supplier A can conduct transactions with other tiered suppliers in the supply chain based on tokens in its possession. For example, Supplier A can pay 20 tokens to a U-Node 108 associated with a tiered supplier. Further, Supplier A also has the option to convert tokens received from the entity to fiat or digital currency. For example, after paying 20 tokens to the tiered supplier, Supplier A can opt to exchange the remaining 50 tokens for fiat or digital currency. In this example, Supplier A can interact with the I-Nodes 102 and/or the financial institution 104 to exchange the 50 tokens for 50 USD. For example, Supplier A can transfer the 50 tokens to a digital wallet associated with the entity. The entity can instruct the financial institution 104 to transfer the 50 USD from the bank account 105. In some embodiments, a computing system associated with the financial institution 104 can be configured to exchange tokens for fiat currency or digital currency. In such embodiments, the computing system can transfer the fiat currency or digital currency from the bank account 105 associated with Company A. Once transferred, the exchanged tokens can be burned (or cryptographically destroyed).

The I-Nodes 122 and the T-Nodes 126 can be configured to manage a blockchain-based supply chain payment network for Company B. For example, the !-Nodes 122 can be configured to mint and burn cryptocurrency tokens as needed to support the blockchain-based supply chain payment network. In some embodiments, the minted tokens are stablecoins pegged to a fiat currency. For example, a single token can be pegged to a single U.S. dollar. Thus, when minting tokens under such embodiments, Company B can cause some amount of fiat currency to be deposited in a bank account 125 associated with the financial institution 124. The amount deposited can be consistent with an amount of minted tokens to be redeemable. However, as mentioned, Company B can also deposit a lesser amount of fiat currency to mint the tokens. Once deposited, the I-Nodes 122 can be instructed to mint tokens. The I-Nodes 122 can also be instructed to transact with suppliers based on the minted tokens. The I-Node 122 can be configured to generate a data record reflecting each transaction. The data record can correspond to a blockchain transaction to be posted to the blockchain associated with the blockchain network 130. The data record may include various details describing the transaction, such a transaction description (e.g., transaction date, sender address, destination address, transaction amount), entity information (e.g., entity name, wallet address, etc.), among other information. The data record may then be posted to the blockchain. For example, the data record may be posted by the I-Node 122. The data record may be subsequently verified by one or more nodes included in the blockchain network 130, such as the T-Nodes 126. The data record may then be a part of the blockchain associated with the blockchain network 130. For example, an !-Node 122 can be instructed to provide a payment based on minted tokens to suppliers. Suppliers can transact with other suppliers based on the minted tokens. Suppliers can also redeem (or exchange) tokens received to fiat or digital currency, as described above.

In some instances, suppliers may be associated with multiple blockchain-based supply chain payment networks. For example, a Tier 1 supplier may provide parts to multiple companies. In such instances, a node associated with the Tier 1 supplier can be associated with multiple blockchain networks. For example, in FIG. 1A, a T-Node 110 controlled by the Tier 1 supplier is included in both the blockchain-based supply chain payment network associated with Company A (e.g., the blockchain network 120) and the blockchain-based supply chain payment network associated with Company B (e.g., the blockchain network 130). In this example, the T-Node 110 can be configured to implement blockchain protocols utilized by both the blockchain network 120 and the blockchain network 130. Many variations are possible. In another example, a Tier 2 supplier may participate in both the blockchain-based supply chain payment network associated with Company A (e.g., the blockchain network 120) and the blockchain-based supply chain payment network associated with Company B (e.g., the blockchain network 130). In such instances, a U-Node 112 associated with the Tier 2 supplier can be configured to conduct transactions based on tokens for different blockchain-based supply chain payment networks. For example, the U-Node 112 can implement a multi-token digital wallet that can manage tokens minted by the I-Nodes 102 associated with Company A and tokens minted by the I-Nodes 122 associated with Company B. Many variations are possible.

Figure 1B:
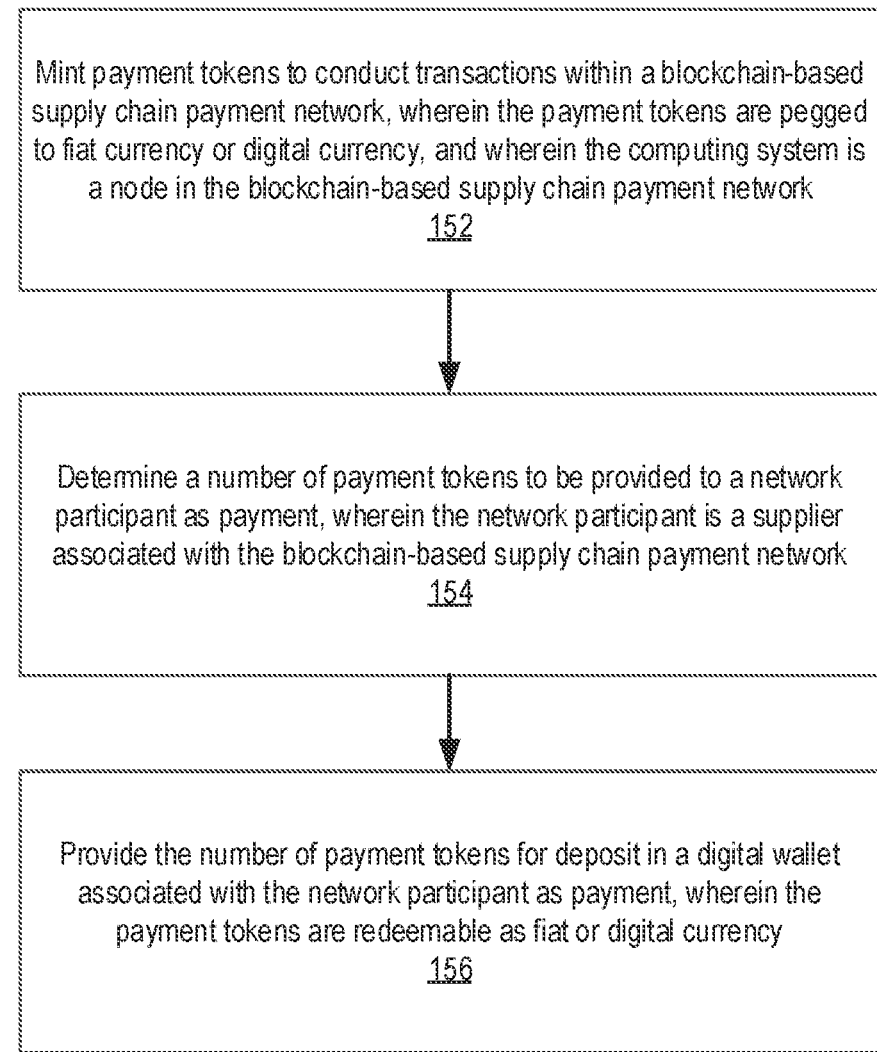
FIG. 1B illustrates a flowchart of an example method, in accordance with various embodiments of the present technology.

FIG. 1B illustrates a flowchart of an example method 150, according to various embodiments of the present disclosure. For example, the method 150 can be performed by the system 100 of FIG. 1A.

At block 152, payment tokens to conduct transactions within a blockchain-based supply chain payment network can be minted. The payment tokens can be pegged to fiat currency or digital currency. The payment tokens can be minted by a computing system that serves as a node in the blockchain-based supply chain payment network. At block 154, a number of payment tokens to be provided to a network participant as payment can be determined. The network participant can be a supplier associated with the blockchain-based supply chain payment network. At block 156, the number of payment tokens can be provided for deposit in a digital wallet associated with the network participant as payment. The payment tokens can be redeemed as fiat or digital currency, as described herein.

The operations of method 150 are intended to be illustrative. Depending on the implementation, the example method 150 may include additional, fewer, or alternative steps performed in various orders or in parallel. The example method 150 may be implemented in various computing systems or devices including one or more processors.

Figure 2A:
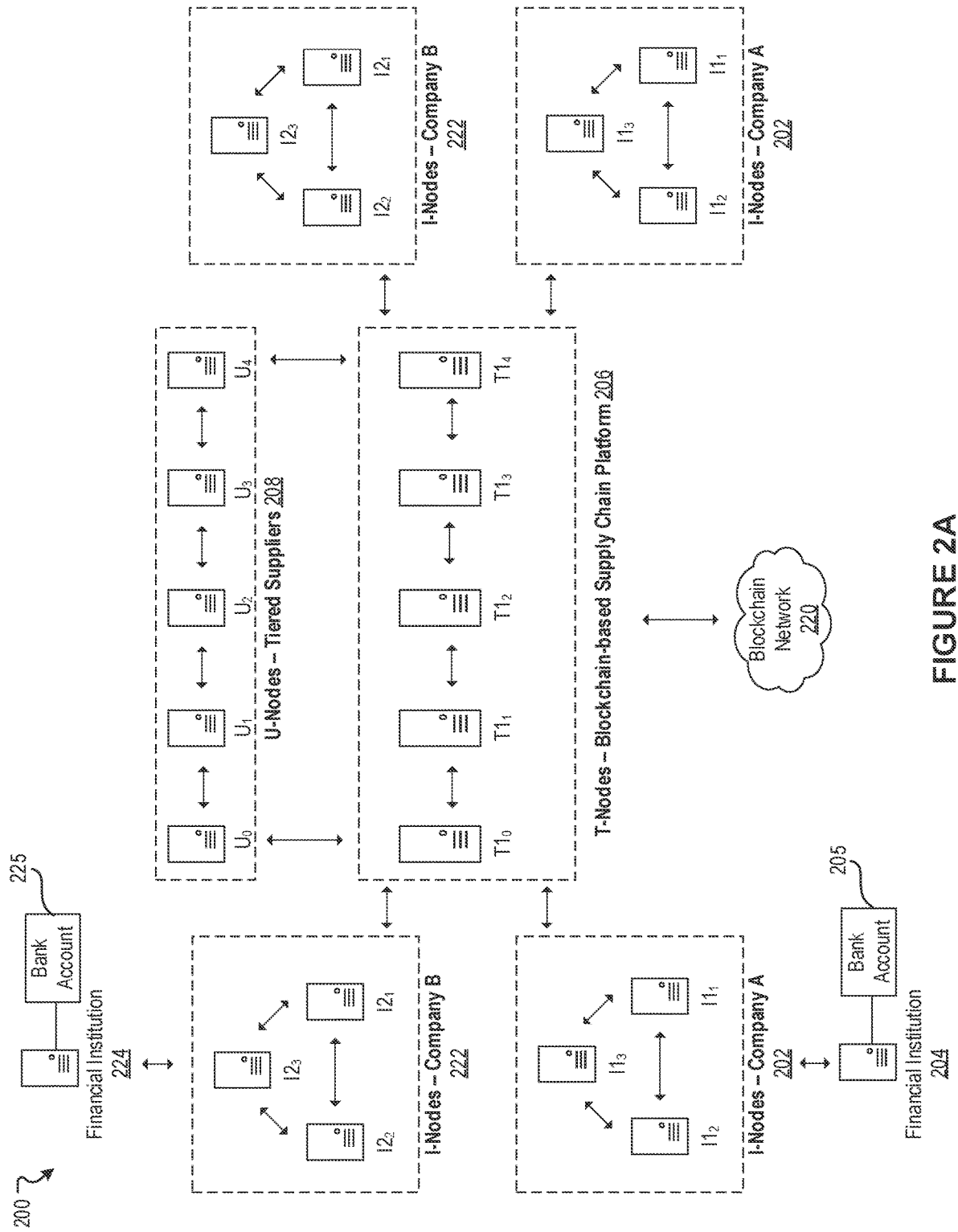
FIG. 2A illustrates another example system for implementing blockchain-based supply chain payment networks based on a unified blockchain, in accordance with various embodiments of the present technology.

FIG. 2A illustrates a system 200 for implementing blockchain-based supply chain payment networks. The system 200 can include I-Nodes 202 controlled by an entity (e.g., "Company A"), a financial institution 204, T-Nodes 206 controlled or hosted by a data platform or service provider that facilitates blockchain-based supply chain payment networks, and U-nodes 208 controlled by suppliers in supply chain networks associated with Company A and/or other companies, such as Company B. The system 200 can also include I-Nodes 222 controlled by another entity (e.g., "Company B") and a financial institution 224. For example, an I-Node 202 and an I-Node 222 can implement an I-Node module 404, as described in reference to FIG. 4. A T-Node 206 can implement a T-Node module 504, as described in reference to FIG. 5. Further, a U-Node 208 can implement a U-Node module 604, as described in reference to FIG. 6. In some embodiments, the I-Nodes 202, I-Nodes 222, T-Nodes 206, and U-Nodes 208 can participate as nodes in a blockchain network 220. In some embodiments, the !-Nodes 202, I-Nodes 222, and T-Nodes 206 can participate as nodes in the blockchain network 220 while the U-Nodes 208 operate as digital wallets.

In some embodiments, a computing system associated with the financial institution 204 can implement a digital wallet that facilitates the transfer of tokens from tiered suppliers (e.g., U-Nodes 208) to the financial institution 204. For example, the computing system associated with the financial institution 204 can facilitate conversion of payment tokens to fiat or digital currency. For example, the computing system associated with the financial institution 204 can facilitate conversion of payment tokens to fiat or digital currency for suppliers included in a blockchain-based supply chain payment network associated with Company A. In some embodiments, a computing system associated with the financial institution 204 can implement an I-Node module 404, as described in reference to FIG. 4. In some embodiments, a computing system associated with the financial institution 204 can implement a U-Node module 604, as described in reference to FIG. 6. Similarly, a computing system associated with the financial institution 224 can implement a digital wallet that facilitates the transfer of tokens from tiered suppliers (e.g., U-Nodes 208) to the financial institution 224. For example, the computing system associated with the financial institution 224 can facilitate conversion of payment tokens to fiat or digital currency for suppliers included in a blockchain-based supply chain payment network associated with Company B. In some embodiments, a computing system associated with the financial institution 224 can implement an I-Node module 404, as described in reference to FIG. 4. In some embodiments, a computing system associated with the financial institution 224 can implement a U-Node module 604, as described in reference to FIG. 6. In some embodiments, rather than relying on the financial institutions 204, 224 to exchange tokens to fiat or digital currency, the data platform hosting service provider that controls the T-Nodes 206 can provide services to exchange tokens to fiat or digital currency. For example, a network participant associated with the blockchain-based supply chain payment network for Company A can transfer payment tokens minted for circulation in the blockchain-based supply chain payment network for Company A to the data platform or hosting service provider for redemption. The data platform or hosting service provider can convert the payment tokens to fiat or digital currency, and can transfer the fiat currency to a bank account associated with the network participant. Once transferred, the exchanged tokens can be burned (or cryptographically destroyed). Similarly, a network participant associated with the blockchain-based supply chain payment network for Company B can transfer payment tokens minted for circulation in the blockchain-based supply chain payment network for Company B to the data platform or hosting service provider for redemption. The data platform or hosting service provider can convert the payment tokens to fiat or digital currency, and can transfer the fiat or digital currency to a bank account associated with the network participant. Once transferred, the exchanged tokens can be burned (or cryptographically destroyed).

The blockchain network 220 can be associated with a unified blockchain. In various embodiments, the unified blockchain can be used to record transactions that occur in multiple blockchain-based supply chain payment networks. That is, the unified blockchain supports transactions based on different types of payment tokens. For example, in FIG. 2A, the unified blockchain can be used to record transactions that occur in supply chain payment networks associated with both Company A and Company B. For example, the unified blockchain can support transactions that involve payments based on payment tokens minted by Company A (e.g., the I-Nodes 202) and transactions that involve payments based on payment tokens minted by Company B (e.g., the I-Nodes 222). In some embodiments, the unified blockchain associated with the blockchain network 220 can be a "private" blockchain that is restricted to Company A and/or Company B, and their suppliers. In some embodiments, the I-Nodes 202, !-Nodes 222, and T-Nodes 206 can be configured to post blockchain transactions to the unified blockchain associated with the blockchain network 220. The I-Nodes 202, !-Nodes 222, and T-Nodes 206 can also be configured to validate transactions posted to the unified blockchain. In some embodiments, only T-Nodes 206 can be configured to post transactions to the unified blockchain associated with the blockchain network 220 and validate transactions posted to the unified blockchain. In general, transactions posted to the unified blockchain can be validated using generally known techniques including, for example, proof of work calculations and confirmations, proof of stake calculations and confirmations, proof of authority calculations and confirmations, proof of history calculations and confirmations, proof of two calculations and confirmations, and proof of N calculations and confirmations, to name some examples.

The I-Nodes 202 can be configured to manage a blockchain-based supply chain payment network for Company A. For example, the I-Nodes 202 can be configured to mint and burn payment tokens as needed to support the blockchain-based supply chain payment network. In some embodiments, the minted tokens are stablecoins pegged to a fiat or digital currency. For example, a single token can be pegged to a single U.S. dollar. Thus, when minting tokens under such embodiments, Company A can cause some amount of fiat currency to be deposited in a bank account 205 associated with the financial institution 204. The amount deposited can be consistent with or less than an amount of tokens to be minted. Once deposited, the !-Nodes 202 can be instructed to mint tokens commensurate to the amount of fiat currency deposited or payable. The I-Nodes 202 can also be instructed to transact with suppliers based on the minted tokens. The I-Node 202 can be configured to generate a data record reflecting each transaction. The data record can correspond to a blockchain transaction to be posted to the blockchain associated with the blockchain network 220. The data record may include various details describing the transaction, such a transaction description (e.g., transaction date, sender address, destination address, transaction amount), entity information (e.g., entity name, wallet address, etc.), among other information. The data record may then be posted to the blockchain. For example, the data record may be posted by the I-Node 202. The data record may be subsequently verified by one or more nodes included in the blockchain network 220, such as the T-Nodes 206. The data record may then be a part of the blockchain associated with the blockchain network 220. For example, an I-Node 202 can be instructed to provide a payment based on minted tokens to suppliers. Suppliers can transact with other suppliers based on the minted tokens. Suppliers can also redeem (or exchange) tokens received to fiat or digital currency, as described above.

For example, when minting tokens under such embodiments, Company A can cause some amount of fiat currency to be deposited in a bank account 205 associated with the financial institution 204. The amount deposited can be consistent with or less than an amount of tokens to be minted. For example, Company A can deposit $100 to mint 100 tokens. In another example, Company A can deposit $50 to mint 100 tokens. Once deposited, the I-Nodes 202 can be instructed to mint tokens commensurate to the amount of fiat currency deposited or payable. The I-Nodes 202 can also be instructed to transact with suppliers based on the minted tokens. For example, an I-Node 202 can be instructed to initiate a payment of 70 tokens to a Tier 1 supplier ("Supplier A"). The !-Node 202 can be configured to generate a data record reflecting the transaction. The data record can correspond to a blockchain transaction to be posted to the blockchain associated with the blockchain network 220. The data record may include various details describing the transaction, such a transaction description (e.g., transaction date, sender address, destination address, transaction amount), entity information (e.g., entity name, wallet address, etc.), among other information. The data record may then be posted to the blockchain. For example, the data record may be posted and verified by one or more nodes included in the blockchain network 220, such as the T-Nodes 206. The data record may then be a part of the blockchain associated with the blockchain network 220. Supplier A can conduct transactions with other tiered suppliers in the supply chain based on tokens available to Supplier A. For example, Supplier A can pay 20 tokens to a network participant that corresponds to a tiered supplier. Further, Supplier A also has the option to convert tokens received from the entity to fiat or digital currency. For example, after paying 20 tokens to the tiered supplier, Supplier A can opt to exchange the remaining 50 tokens for fiat or digital currency. In this example, Supplier A can interact with the I-Nodes 202 and/or the financial institution 204 to exchange the 50 tokens for 50 USD. The exchanged tokens can be burned (or cryptographically destroyed).

Similarly, the I-Nodes 222 can be configured to manage a blockchain-based supply chain payment network for Company B. For example, the I-Nodes 222 can be configured to mint and burn payment tokens as needed to support the blockchain-based supply chain payment network. Further, transactions can be conducted based on the minted payment tokens. In various embodiments, payment tokens minted for a particular blockchain-based supply chain payment network can only be used to conduct transactions within that blockchain-based supply chain payment network. In such embodiments, tokens minted by Company A can only be used to conduct transactions with participants in the blockchain-based supply chain payment network associated with Company A. Further, tokens minted by Company B can only be used to conduct transactions with participants in the blockchain-based supply chain payment network associated with Company B.

For example, when minting tokens under such embodiments, Company B can cause some amount of fiat currency to be deposited in a bank account 225 associated with the financial institution 224. The amount deposited can be consistent with or less than an amount of tokens to be minted. For example, Company B can deposit $200 to mint 200 tokens. Once deposited, the I-Nodes 222 can be instructed to mint tokens commensurate to the amount of fiat currency deposited or payable. The I-Nodes 222 can also be instructed to transact with suppliers based on the minted tokens. For example, an I-Node 222 can be instructed to initiate a payment of 170 tokens to a Tier 1 supplier ("Supplier B"). The I-Node 222 can be configured to generate a data record reflecting the transaction. The data record can correspond to a blockchain transaction to be posted to the blockchain associated with the blockchain network 220. The data record may include various details describing the transaction, such a transaction description (e.g., transaction date, sender address, destination address, transaction amount), entity information (e.g., entity name, wallet address, etc.), among other information. The data record may then be posted to the blockchain. For example, the data record may be posted and verified by one or more nodes included in the blockchain network 220, such as the T-Nodes 206. The data record may then be a part of the blockchain associated with the blockchain network 220. Supplier B can conduct transactions with other tiered suppliers in the supply chain based on tokens available to Supplier B. For example, Supplier B can pay 120 tokens to a network participant that corresponds to a tiered supplier. Further, Supplier B also has the option to convert tokens received from the entity to fiat or digital currency. For example, after paying 120 tokens to the tiered supplier, Supplier B can opt to exchange the remaining 50 tokens for fiat or digital currency. In this example, Supplier B can interact with the I-Nodes 222 and/or the financial institution 224 to exchange the 50 tokens for 50 USD in fiat or digital currency. Once complete, the exchanged tokens can be burned (or cryptographically destroyed).

Figure 2B:
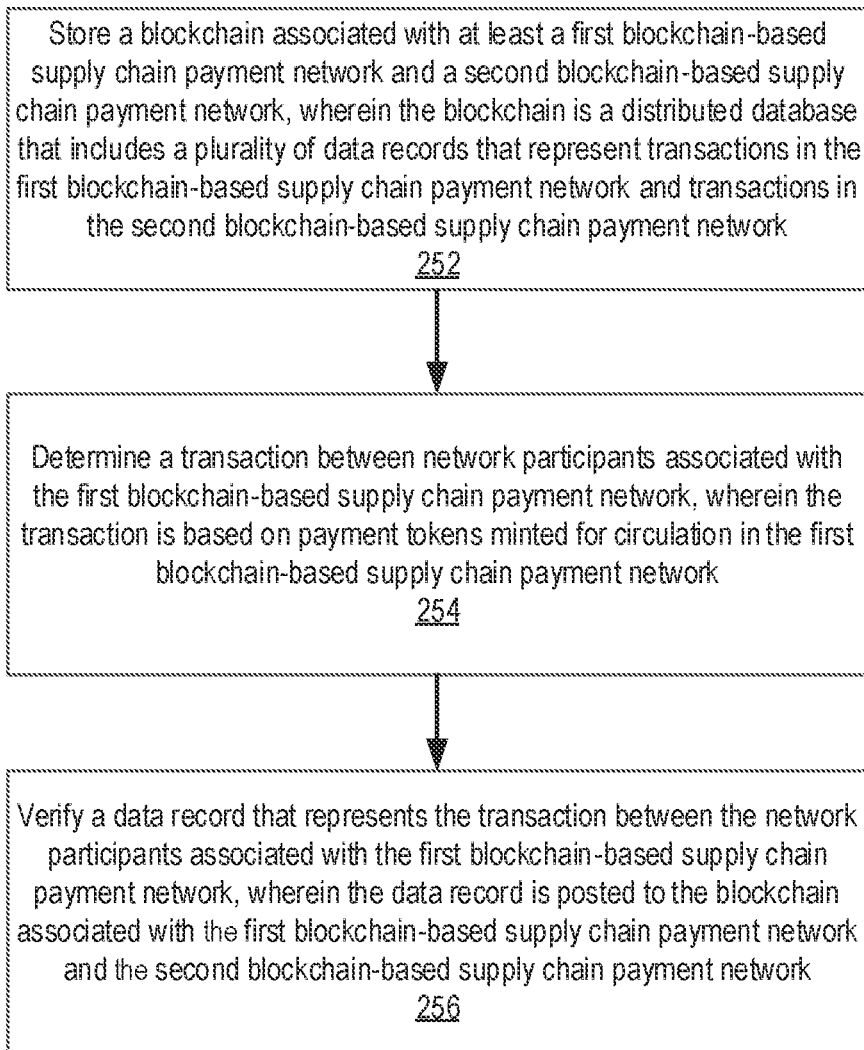
FIG. 2B illustrates another flowchart of an example method, in accordance with various embodiments of the present technology

FIG. 2B illustrates a flowchart of an example method 250, according to various embodiments of the present disclosure. For example, the method 250 can be performed by the system 200 of FIG. 2A.

At block 252, a blockchain associated with at least a first blockchain-based supply chain payment network and a second blockchain-based supply chain payment network is stored. The blockchain can be a distributed database that includes a plurality of data records that represent transactions in the first blockchain-based supply chain payment network and transactions in the second blockchain-based supply chain payment network. At block 254, a transaction between network participants associated with the first blockchain-based supply chain payment network can be determined. The transaction can be based on payment tokens minted for circulation in the first blockchain-based supply chain payment network. At block 256, a data record that represents the transaction between the network participants associated with the first blockchain-based supply chain payment network can be verified. The data record can be posted to the blockchain associated with the first blockchain-based supply chain payment network and the second blockchain-based supply chain payment network.

The operations of method 250 are intended to be illustrative. Depending on the implementation, the example method 250 may include additional, fewer, or alternative steps performed in various orders or in parallel. The example method 250 may be implemented in various computing systems or devices including one or more processors.

Figure 3A:
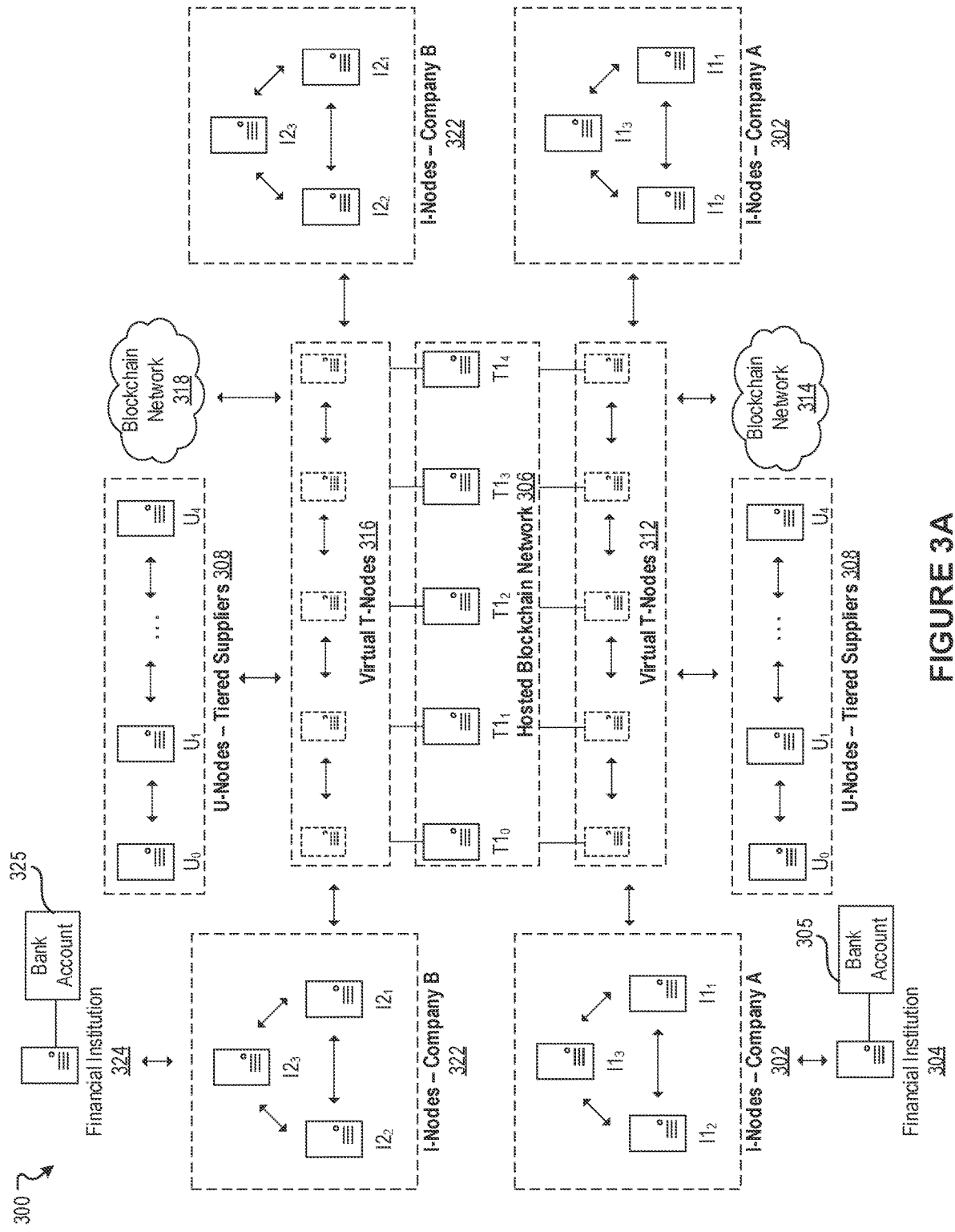
FIG. 3A illustrates another example system for implementing virtualized blockchain-based supply chain payment networks, in accordance with various embodiments of the present technology.

FIG. 3A illustrates a system 300 for implementing virtualized blockchain-based supply chain payment networks. The system 300 can include I-Nodes 302 controlled by a first entity (e.g., "Company A"), a financial institution 304 associated with the first entity, I-Nodes 322 controlled by a second entity (e.g., "Company B"), a financial institution 324 associated with the second entity, a hosted blockchain network 306 that facilitates blockchain-based supply chain payment networks, and U-nodes 308 controlled by suppliers in various supply chain networks. The hosted blockchain network 306 can provide one or more computing systems that host a first set of virtual T-nodes 312 that manage a first blockchain-based supply chain payment network associated with Company A and a second set of virtual T-Nodes 316 that manage a second blockchain-based supply chain payment network associated with Company B. For example, a computing system associated with the hosted blockchain network 306 can implement generally known virtualization techniques to run a first virtual machine that serves as a virtual T-Node for the first blockchain-based supply chain payment network associated with Company A and a second virtual machine that serves as a virtual T-Node for the second blockchain-based supply chain payment network associated with Company B.

In various embodiments, the I-Nodes 302, virtual T-Nodes 312, and U-Nodes 308 can be associated with the first blockchain-based supply chain payment network for Company A. Thus, the I-Nodes 302, virtual T-Nodes 312, and U-Nodes 308 can participate as nodes in a blockchain network 314 associated with the first blockchain-based supply chain payment network. In some embodiments, the I-Nodes 302 and virtual T-Nodes 312 can participate as nodes in the blockchain network 314 while the U-Nodes 308 operate as digital wallets. For example, an I-Node 302 can implement an !-Node module 404, as described in reference to FIG. 4. A virtual T-Node 312 can implement a T-Node module 504, as described in reference to FIG. 5. Further, a U-Node 308 can implement a U-Node module 604, as described in reference to FIG. 6. The nodes in the first blockchain-based supply chain payment network can post and validate transactions that occur based on payment tokens minted for circulation in the first blockchain-based supply chain payment network. For example, the nodes can implement a blockchain protocol associated with the blockchain network 314.

The blockchain network 314 can be associated with a first blockchain. In various embodiments, the first blockchain can be used to record transactions that occur in the first blockchain-based supply chain payment network. That is, the first blockchain supports transactions based on payment tokens minted for circulation in the first blockchain-based supply chain payment network. For example, in FIG. 3A, the first blockchain can be used to record transactions that occur in the supply chain network associated with Company A. For example, the first blockchain can support transactions that involve payments based on payment tokens minted by Company A (e.g., the I-Nodes 302). In some embodiments, the first blockchain associated with the blockchain network 314 can be a "private" blockchain that is restricted to Company A and its suppliers. In some embodiments, the I-Nodes 302 and/or virtual T-Nodes 312 can be configured to post blockchain transactions to the first blockchain associated with the blockchain network 314. The I-Nodes 302 and/or virtual T-Nodes 312 can also be configured to validate transactions posted to the first blockchain. In some embodiments, only virtual T-Nodes 312 can be configured to post and validate transactions to the first blockchain. In general, transactions posted to the blockchain can be validated using generally known techniques including, for example, proof of work calculations and confirmations, proof of stake calculations and confirmations, proof of authority calculations and confirmations, proof of history calculations and confirmations, proof of two calculations and confirmations, and proof of N calculations and confirmations, to name some examples.

In various embodiments, the I-Nodes 322, virtual T-Nodes 316, and U-Nodes 308 can be associated with the second blockchain-based supply chain payment network for Company B. Thus, the I-Nodes 322, virtual T-Nodes 316, and U-Nodes 308 can participate as nodes in a blockchain network 318 associated with the second blockchain-based supply chain payment network. In some embodiments, the I-Nodes 322 and virtual T-Nodes 316 can participate as nodes in the blockchain network 318 while the U-Nodes 308 operate as digital wallets. For example, an I-Node 322 can implement an I-Node module 404, as described in reference to FIG. 4. A virtual T-Node 316 can implement a T-Node module 504, as described in reference to FIG. 5. The nodes in the second blockchain-based supply chain payment network can post and validate transactions that occur based on payment tokens minted for circulation in the second blockchain-based supply chain payment network. For example, the nodes can implement the same or different blockchain protocol associated with the blockchain network 318.

The blockchain network 318 can be associated with a second blockchain. In various embodiments, the second blockchain can be used to record transactions that occur in the second blockchain-based supply chain payment network. That is, the second blockchain supports transactions based on payment tokens minted for circulation in the second blockchain-based supply chain payment network. For example, in FIG. 3A, the second blockchain can be used to record transactions that occur in the supply chain payment network associated with Company B. For example, the second blockchain can support transactions that involve payments based on payment tokens minted by Company B (e.g., the I-Nodes 322). In some embodiments, the second blockchain associated with the blockchain network 314 can be a "private" blockchain that is restricted to Company B and its suppliers. In some embodiments, the I-Nodes 322 and virtual T-Nodes 316 can be configured to post blockchain transactions to the second blockchain associated with the blockchain network 314. The I-Nodes 322 and virtual T-Nodes 316 can also be configured to validate transactions posted to the second blockchain. In some embodiments, only virtual T-Nodes 316 can be configured to post and validate transactions to the second blockchain. In general, transactions posted to the second blockchain can be validated using generally known techniques including, for example, proof of work calculations and confirmations, proof of stake calculations and confirmations, proof of authority calculations and confirmations, proof of history calculations and confirmations, proof of two calculations and confirmations, and proof of N calculations and confirmations, to name some examples.

The I-Nodes 302 can be configured to manage the first blockchain-based supply chain payment network for Company A. For example, the I-Nodes 302 can be configured to mint and burn payment tokens as needed to support the blockchain-based supply chain payment network. In some embodiments, the minted tokens are stablecoins pegged to a fiat currency. For example, a single token can be pegged to a single U.S. dollar. Thus, when minting tokens under such embodiments, Company A can cause some amount of fiat currency to be deposited in a bank account 305 associated with the financial institution 304. The amount deposited can be consistent with or less than an amount of tokens to be minted. For example, Company A can deposit $100 to mint 100 tokens. Once deposited, the I-Nodes 302 can be instructed to mint tokens commensurate to the amount of fiat or digital currency deposited or payable. The I-Nodes 302 can also be instructed to transact with suppliers based on the minted tokens. For example, an I-Node 302 can be instructed to initiate a payment of 70 tokens to a Tier 1 supplier ("Supplier A"). The I-Node 302 can be configured to generate a data record reflecting the transaction. The data record can correspond to a blockchain transaction to be posted to the first blockchain associated with the blockchain network 314. The data record may include various details describing the transaction, such a transaction description (e.g., transaction date, sender address, destination address, transaction amount), entity information (e.g., entity name, wallet address, etc.), among other information. The data record may then be posted to the first blockchain. For example, the data record may be posted by the I-Node 302. The data record may be subsequently verified by one or more nodes included in the blockchain network 314, such as the virtual T-Nodes 312. The data record may then be a part of the first blockchain associated with the blockchain network 314. Supplier A can conduct transactions with other tiered suppliers in the supply chain. For example, Supplier A can pay 20 tokens to a network participant that corresponds to a tiered supplier. Further, Supplier A also has the option to convert tokens received from the entity to fiat or digital currency, as described below.

The I-Nodes 322 can be configured to manage the second blockchain-based supply chain payment network for Company B. For example, the I-Nodes 322 can be configured to mint and burn payment tokens as needed to support the second blockchain-based supply chain payment network. In some embodiments, the minted tokens are stablecoins pegged to a fiat currency. For example, a single token can be pegged to a single U.S. dollar. Thus, when minting tokens under such embodiments, Company B can cause some amount of fiat currency to be deposited in a bank account 325 associated with the financial institution 324. The amount deposited can be consistent with or less than an amount of tokens to be minted. For example, Company B can deposit $200 to mint 200 tokens. Once deposited, the I-Nodes 322 can be instructed to mint tokens commensurate to the amount of fiat currency deposited or payable. The I-Nodes 322 can also be instructed to transact with suppliers based on the minted tokens. For example, an I-Node 322 can be instructed to initiate a payment of 170 tokens to a Tier 1 supplier ("Supplier B"). The I-Node 322 can be configured to generate a data record reflecting the transaction. The data record can correspond to a blockchain transaction to be posted to the second blockchain associated with the blockchain network 318. The data record may include various details describing the transaction, such a transaction description (e.g., transaction date, sender address, destination address, transaction amount), entity information (e.g., entity name, wallet address, etc.), among other information. The data record may then be posted to the second blockchain. For example, the data record may be posted by the I-Node 322. The data record may be subsequently verified by one or more nodes included in the blockchain network 318, such as the virtual T-Nodes 316. The data record may then be a part of the second blockchain associated with the blockchain network 318. Based on tokens available, Supplier B can conduct transactions with other tiered suppliers in the supply chain. For example, Supplier B can pay 120 tokens to a network participant that corresponds to a tiered supplier. Further, Supplier B also has the option to convert tokens received from the entity to fiat or digital currency, as described below.

In some embodiments, a computing system associated with the financial institution 304 can implement a digital wallet that facilitates the transfer of tokens from tiered suppliers (e.g., U-Nodes 308) to the financial institution 304. For example, the computing system associated with the financial institution 304 can facilitate conversion of payment tokens to fiat or digital currency. For example, the computing system associated with the financial institution 304 can facilitate conversion of payment tokens to fiat or digital currency for suppliers included in the first blockchain-based supply chain payment network associated with Company A. In some embodiments, a computing system associated with the financial institution 304 can implement an I-Node module 404, as described in reference to FIG. 4. In such embodiments, the financial institution 304 can mint and burn tokens for Company A. In some embodiments, a computing system associated with the financial institution 304 can implement a U-Node module 604, as described in reference to FIG. 6. Similarly, in some embodiments, a computing system associated with the financial institution 324 can implement a digital wallet that facilitates the transfer of tokens from tiered suppliers (e.g., U-Nodes 308) to the financial institution 324. For example, the computing system associated with the financial institution 324 can facilitate conversion of payment tokens to fiat or digital currency. For example, the computing system associated with the financial institution 324 can facilitate conversion of payment tokens to fiat or digital currency for suppliers included in the second blockchain-based supply chain payment network associated with Company B. In some embodiments, a computing system associated with the financial institution 324 can implement an I-Node module 404, as described in reference to FIG. 4. In such embodiments, the financial institution 324 can mint and burn tokens for Company B. In some embodiments, a computing system associated with the financial institution 324 can implement a U-Node module 604, as described in reference to FIG. 6. In some embodiments, rather than relying on the financial institutions 304, 324 to exchange tokens to fiat currency, the hosted blockchain network 306 can provide services to exchange tokens to fiat or digital currency. For example, a network participant associated with the first blockchain-based supply chain payment network for Company A can transfer payment tokens minted for circulation in the first blockchain-based supply chain payment network for Company A to the hosted blockchain network 306 for redemption. The hosted blockchain network 306 can convert the payment tokens to fiat or digital currency, and can transfer the fiat or digital currency to a bank account associated with the network participant. Once transferred, the exchanged tokens can be burned (or cryptographically destroyed). Similarly, a network participant associated with the second blockchain-based supply chain payment network for Company B can transfer payment tokens minted for circulation in the second blockchain-based supply chain payment network for Company B to the hosted blockchain network 306 for redemption. The hosted blockchain network 306 can convert the payment tokens to fiat or digital currency, and can transfer the fiat or digital currency to a bank account associated with the network participant. Once transferred, the exchanged tokens can be burned (or cryptographically destroyed). Many variations are possible.

Figure 3B:
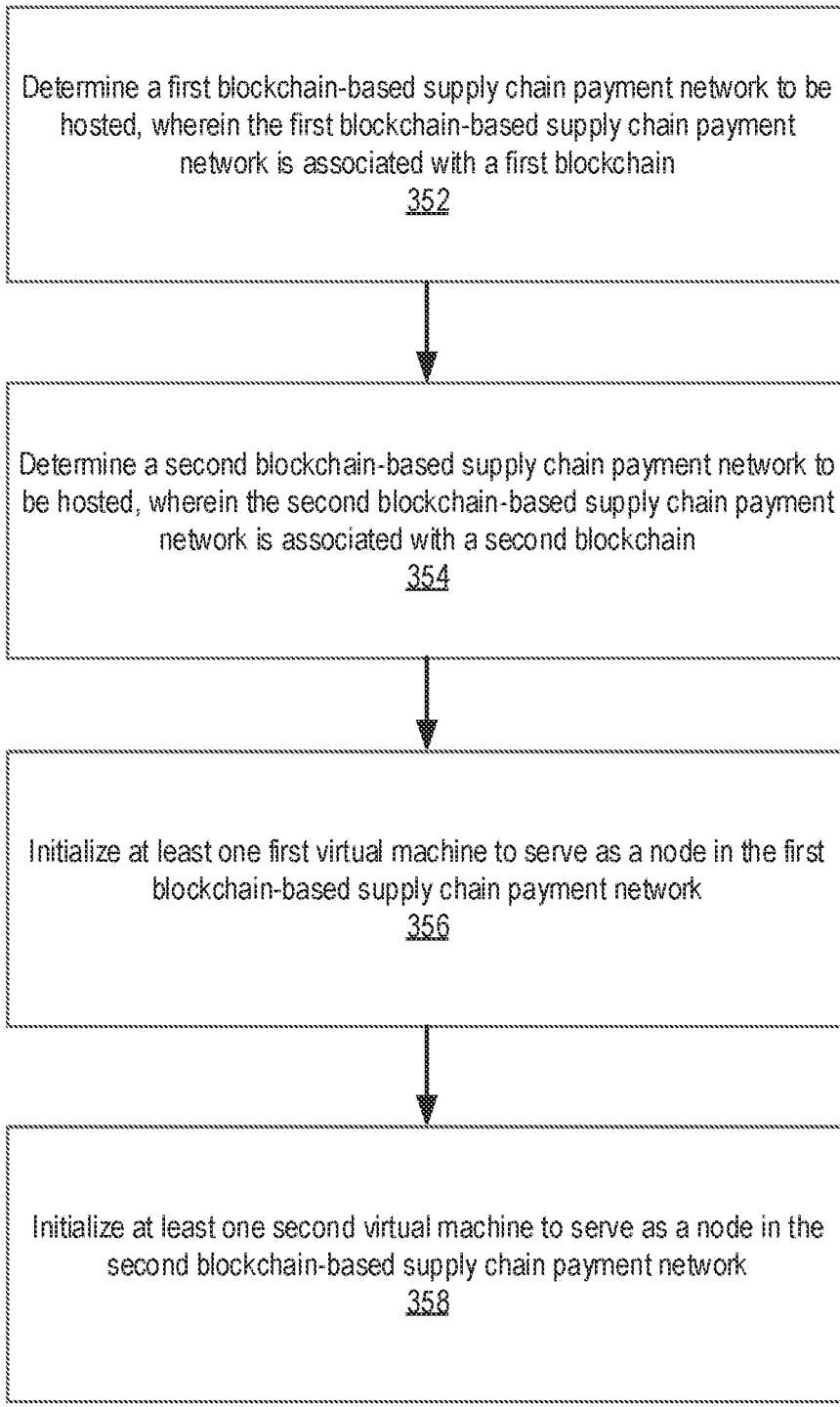
FIG. 3B illustrates another flowchart of an example method, in accordance with various embodiments of the present technology.

FIG. 3B illustrates a flowchart of an example method 350, according to various embodiments of the present disclosure. For example, the method 350 can be performed by the system 300 of FIG. 3A.

At block 352, a first blockchain-based supply chain payment network to be hosted can be determined. The first blockchain-based supply chain payment network can be associated with a first blockchain. At block 354, a second blockchain-based supply chain payment network to be hosted can be determined. The second blockchain-based supply chain payment network can be associated with a second blockchain. At block 356, at least one first virtual machine can be initialized to serve as a node in the first blockchain-based supply chain payment network. At block 358, at least one second virtual machine can be initialized to serve as a node in the second blockchain-based supply chain payment network.

The operations of method 350 are intended to be illustrative. Depending on the implementation, the example method 350 may include additional, fewer, or alternative steps performed in various orders or in parallel. The example method 350 may be implemented in various computing systems or devices including one or more processors.

Figure 4:
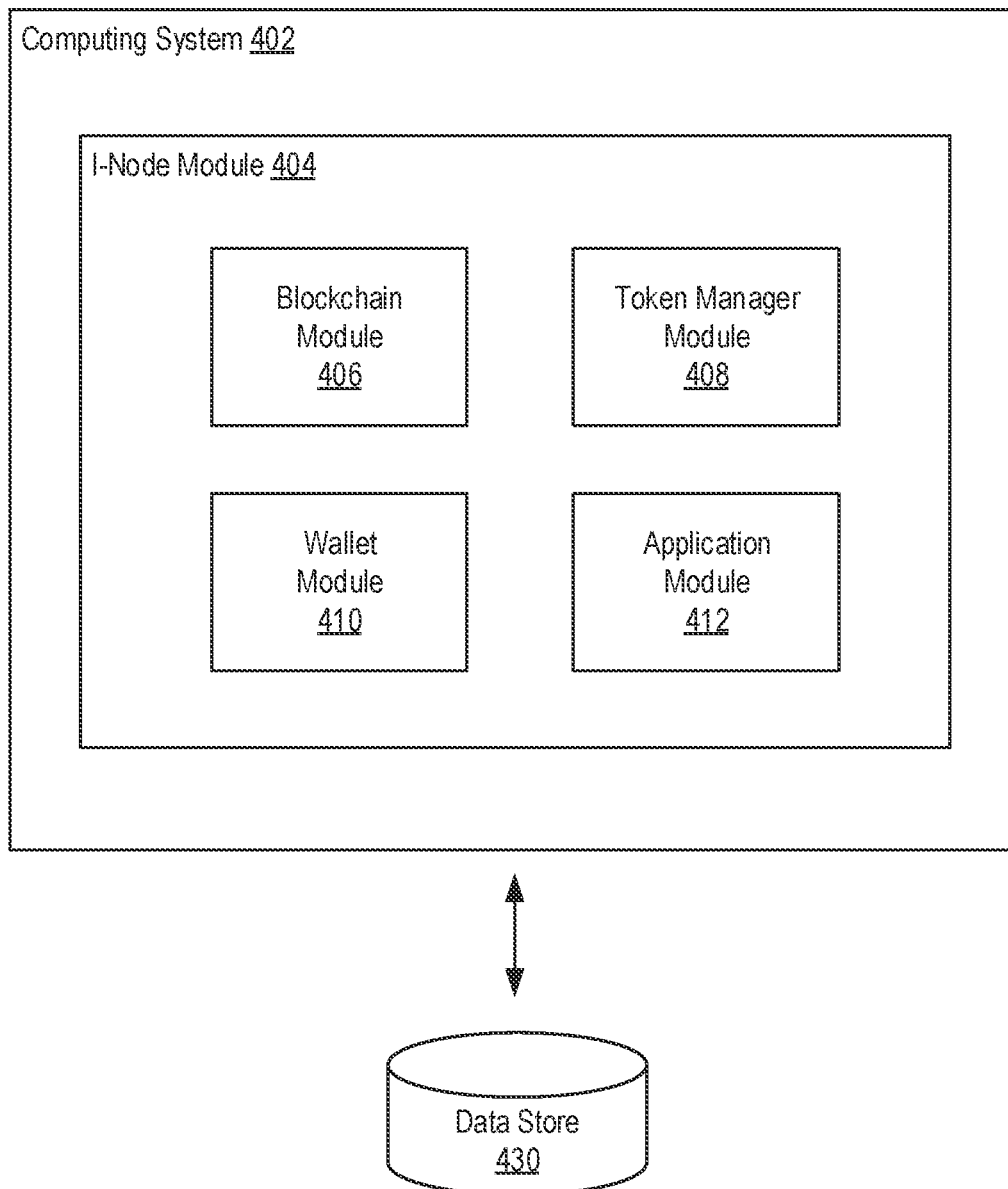
FIG. 4 illustrates an example computing system implementing an I-Node module, in accordance with various embodiments of the present technology.

FIG. 4 illustrates an example environment 400, in accordance with various embodiments. The example environment 400 can include at least a computing system 402. The computing system 402 can include one or more processors and memory among other components, as described in reference to FIG. 8. The processors can be configured to perform various operations by interpreting machine-readable instructions. The computing system 402 can include an I-Node module 404. The I-Node module 404 can include a blockchain module 406, a token manager module 408, a wallet module 410, and an application module 412. The blockchain module 406, token manager module 408, wallet module 410, and application module 412 can be executed by the processor(s) of the computing system 402 to perform various operations, as described below. In some embodiments, the I-Node module 404 can be implemented, in whole or in part, as software that is capable of running on one or more computing systems or devices. In some embodiments, the I-Node module 404 can be implemented, in whole or in part, as software that is capable of running on one or more servers (e.g., cloud servers). In some embodiments, the I-Node module 404 can be implemented, in whole or in part, as software that is capable of running on one or more virtual machines.

Further, the computing system 402 can access a data store 430. In general, a data store may be any device in which data can be stored and from which data can be retrieved. In some embodiments, the data store 430 may store and manage various data, such as blockchain data, information describing blockchain protocols, encryption keys and algorithms, communication protocols and standards, data formatting standards and protocols, program code for modules and application programs of the processing device, and other data that may be suitable for use by the I-Node module 404 to perform the functions disclosed herein. The computing system 402 and the data store 430 may be accessible either directly or over a computer network. The computer network may be any wired or wireless network through which data can be sent and received (e.g., the Internet, local area network, etc.).

The I-Node module 404 can interact with the computing system 402 to send and receive data over one or more networks based on one or more network protocols. For example, the I-Node module 404 can be configured to exchange data (e.g., receive data, send data) with other I-Nodes, T-Nodes, U-Nodes, financial institutions, blockchain networks, and other entities over computer networks, such as the Internet. The I-Node module 404 can also be configured to exchange (e.g., send, receive) blockchain data, for example, with other I-Nodes, T-Nodes, and blockchain networks. The blockchain data may comprise a blockchain and associated data records included in the blockchain. For example, a blockchain data record can describe a blockchain transaction between network participants. The data record can include information, such a transaction description (e.g., transaction date, sender address, destination address, transaction amount), entity information (e.g., entity name, wallet address, etc.), among other information, such as smart contracts associated with the blockchain transaction. The I-Node module 404 can store such blockchain data in the data store 430.

The blockchain module 406 can be configured to manage a blockchain based on a blockchain protocol. In general, the blockchain module 406 can implement generally known blockchain protocols. A blockchain protocol can define a set of rules for managing a blockchain associated with a blockchain network. For example, the blockchain module 406 can implement a blockchain protocol that facilitates transactions based on cryptocurrency (e.g., tokens, coins, stablecoins). The blockchain may be configured to store a plurality of data records using a suitable data storage format and schema. The blockchain may be formatted based on generally known approaches. For example, the blockchain can be stored as a relational database that utilizes structured query language to process structured data sets stored therein. Each data record stored in the blockchain can be associated with a transaction and include blockchain data associated therewith, such as a transaction description (e.g., transaction date, sender address, destination address, transaction amount), entity information (e.g., entity name, wallet address, etc.), among other information as known to persons having skill in the relevant art. As an example, the blockchain can be used to record transactions occurring in a supply chain associated with a first entity (e.g., Company A). In such embodiments, the blockchain can be managed based on a blockchain protocol associated with the first entity. Further, the transactions can be based on cryptocurrency that is managed (e.g., minted, burned) by the first entity.

The blockchain module 406 can be configured to query the blockchain, for example, for transaction details based on terms associated with a search query. For example, the blockchain module 406 can execute queries to retrieve (or identify) blockchain data representing various transactions based on various search criteria. In some embodiments, the blockchain module 406 can restrict which entities are permitted to submit such queries. For example, in some embodiments, only a top-level company associated with a blockchain-based supply chain payment network is permitted to query the blockchain for transactions. In some embodiments, upstream network participants (e.g., top-tier suppliers) can query the blockchain to view transactions that occur with downstream participants (e.g., lower-tier suppliers). In some embodiments, all network participants can query the blockchain to view transactions that occur downstream. Many variations are possible.

The blockchain module 406 can be configured to generate data records to be stored in the blockchain. The data record may be a data record suitable for inclusion in the blockchain and include data suitable for use in validation of a given transaction. The included data may comprise transaction data values. In some embodiments, one or more of the transaction data values included in the generated data record may be hashed and/or encrypted using one or more suitable hashing and encryption algorithms, respectively.

The blockchain module 406 can update the blockchain based on generated data records. For example, the blockchain module 406 can determine that a new transaction has occurred. In this example, the blockchain module 406 can execute a query to update the blockchain to add a data record associated with the new transaction. In some instances, the blockchain may be stored locally, such as a blockchain stored in the data store 430. In other instances, the blockchain may be associated with a blockchain network. In such instances, when the blockchain is updated with a generated data record, the generated data record can be submitted to the blockchain network and/or one or more nodes associated with the blockchain network for validation and posting to the blockchain. In some embodiments, the blockchain module 406 can provide (or broadcast) a notification, for example, to other modules of the I-Node module 404 or nodes in the blockchain network, once the blockchain is updated.

The blockchain module 406 can be configured to verify (or validate) data records to be stored in the blockchain. For example, the blockchain module 406 may receive a data record to be added to a blockchain. The data record can describe a transaction. The blockchain module 406 may be configured to validate the data record using one or more suitable methods, such as a proof of work method associated with the corresponding blockchain including, for example, proof of stake calculations and confirmations, proof of authority calculations and confirmations, proof of history calculations and confirmations, proof of two calculations and confirmations, and proof of N calculations and confirmations, to name some examples. The blockchain module 406 can also output an indication of success or failure for the validation. For example, if the validation of the data record is successful, the blockchain module 406 may indicate that validation of the data record was completed successfully. As a result, the data record can be added to the blockchain and propagated or broadcasted to nodes of a corresponding blockchain network. The blockchain module 406 can also send a notification to the corresponding blockchain network and/or one or more nodes in the corresponding blockchain network to indicate the successful validation of the data record. Many variations are possible.

The blockchain module 406 can be configured to electronically transmit data to the blockchain network for posting new blockchain transactions to the blockchain. In some embodiments, the blockchain module 406 can electronically transmit data to different blockchain networks. In such embodiments, the blockchain module 406 can identify a blockchain network to which data is to be transmitted based on a network identifier associated with the blockchain network as provided in blockchain data (e.g., data records). In some embodiments, the blockchain module 406 can also be configured to transmit validation data to the blockchain network and to nodes associated with the blockchain network. For example, the validation data can be transmitted for data records newly added to the blockchain associated with the blockchain network.

The token manager module 408 can be configured to manage payment tokens that can be used to conduct transactions. For example, the token manager module 408 can be configured to exchange fiat or digital currency for cryptocurrency tokens, minting new tokens as needed, and burning previously used tokens as necessary. In some embodiments, tokens minted by the token manager module 408 are pegged to a fiat currency (e.g., U.S. dollars). As an example, a single token can be pegged to a single U.S. dollar. In such embodiments, an entity (e.g., company) that controls a computing node implementing the I-Node module 404 can provide fiat or digital currency (e.g., US Dollars) to a financial institution in an amount consistent with or less than an amount of tokens to be minted. The minted tokens can be stored in a digital wallet and be used by the entity to pay other entities (e.g., tiered suppliers) in a supply chain. The fiat or digital currency can be stored in an account (e.g., bank account, escrow account) provided by the financial institution. In some embodiments, the financial institution can process requests to redeem (e.g., exchange, cash out) tokens from entities, such as tiered suppliers associated with a supply chain.

The wallet module 410 can be configured to manage one or more digital wallets associated with a given entity (e.g., company). The digital wallets can be implemented using generally known approaches for storing and managing payment tokens. For example, in various embodiments, the wallet module 410 can provide options to send tokens to other entities in a blockchain network and receive tokens from other entities in the blockchain network. In some embodiments, the wallet module 410 provides an option to redeem (or cash out) tokens stored in a digital wallet for fiat or digital currency. For example, an entity can interact with the wallet module 410 to request that some amount of tokens be converted to fiat or digital currency. In this example, the wallet module 410 can determine an amount of fiat or digital currency to be withdrawn from an account at a financial institution based on the amount of tokens to be converted. The wallet module 410 can provide a request to withdraw the amount of fiat or digital currency from the account to a computing system associated with the financial institution. The converted tokens can be burned as part of the withdrawal. In some embodiments, the wallet module 410 can be implemented as a software application that can run on computing devices.

The application module 412 can be configured to use blockchain data for various applications. For example, in some embodiments, the application module 412 can create and evaluate smart contracts based on generally known approaches. A smart contract can involve transactions involving multiple entities in a blockchain network. The application module 412 can provide various options to construct and evaluate smart contracts. For example, a smart contract can be written as computer code that is committed to a blockchain. The smart contract can be associated with conditions. When an event described in the smart contract is triggered, the computer code associated with the smart contract can execute. As an example, a smart contract may be created between a company and a supplier. The smart contract can be associated with a condition that requires the supplier to ship supplies to effectuate a payment by the company. In this example, when the supplies are shipped, the payment can automatically be transferred from a digital wallet associated with the company to a digital wallet associated with the supplier. Many variations are possible.

In some embodiments, the application module 412 can be configured to generate a supply chain report. For example, the application module 412 can query a blockchain to identify transactions associated with a supply chain. The identified transactions can be used to generate a report that identifies various transaction information, such as transaction descriptions (e.g., transaction date, sender address, destination address, transaction amount) and entity information (e.g., entity name, wallet address, etc.), for example. The report can thus identify payments made from one entity to another entity in the supply chain. In such embodiments, a company associated with the supply chain can readily identify suppliers in its supply chain across different tiers based on transactions conducted by those suppliers and related payments based on payment tokens. In some embodiments, the types of information that can be accessed can be restricted. For example, only supplier identity and/or payment amount can be exposed. In some embodiments, the application module 412 can evaluate such supply chain reports for compliance purposes. For example, the application module 412 can evaluate a supply chain report to identify non-compliant suppliers based on a pre-defined list of non-compliant suppliers. For example, based on an evaluation of the supply chain report, the application module 412 can identify a supplier that has previously been cited for labor-related issues. In this example, the company can take action to remove or replace the non-compliant suppliers from its supply chain.

Figure 5:
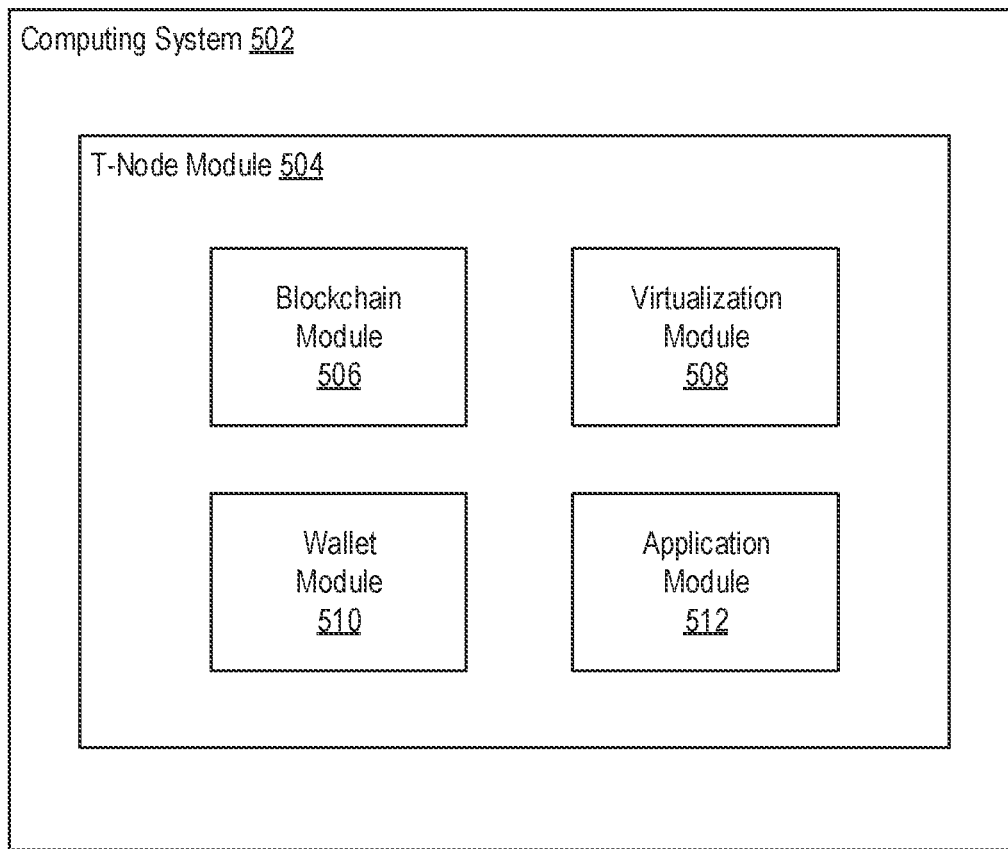
FIG. 5 illustrates an example computing system implementing a T-Node module, in accordance with various embodiments of the present technology.
Figure 5:
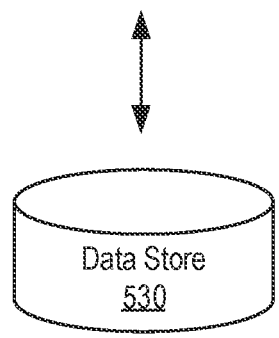

FIG. 5 illustrates an example environment 500, in accordance with various embodiments. The example environment 500 can include at least a computing system 502. The computing system 502 can include one or more processors and memory among other components, as described in reference to FIG. 8. The processors can be configured to perform various operations by interpreting machine-readable instructions. The computing system 502 can include a T-Node module 504. The T-Node module 504 can include a blockchain module 506, a virtualization module 508, a wallet module 510, and an application module 512. The blockchain module 506, virtualization module 508, wallet module 510, and application module 512 can be executed by the processor(s) of the computing system 502 to perform various operations, as described below. In some embodiments, the T-Node module 504 can be implemented, in whole or in part, as software that is capable of running on one or more computing systems or devices. In some embodiments, the T-Node module 504 can be implemented, in whole or in part, as software that is capable of running on one or more servers (e.g., cloud servers). In some embodiments, the T-Node module 504 can be implemented, in whole or in part, as software that is capable of running on one or more virtual machines.

Further, the computing system 502 can access a data store 530. In general, a data store may be any device in which data can be stored and from which data can be retrieved. In some embodiments, the data store 530 may store and manage various data, such as blockchain data, information describing blockchain protocols, encryption keys and algorithms, communication protocols and standards, data formatting standards and protocols, program code for modules and application programs of the processing device, and other data that may be suitable for use by the T-Node module 504 to perform the functions disclosed herein. The computing system 502 and the data store 530 may be accessible either directly or over a computer network. The computer network may be any wired or wireless network through which data can be sent and received (e.g., the Internet, local area network, etc.).

The T-Node module 504 can interact with the computing system 502 to send and receive data over one or more networks based on one or more network protocols. For example, the T-Node module 504 can be configured to exchange data (e.g., receive data, send data) with other I-Nodes, T-Nodes, U-Nodes, financial institutions, blockchain networks, and other entities over computer networks, such as the Internet. The T-Node module 504 can also be configured to exchange (e.g., send, receive) blockchain data, for example, with other I-Nodes, T-Nodes, and blockchain networks. The blockchain data may comprise a blockchain and associated data records included in the blockchain. For example, a blockchain data record can describe a blockchain transaction between network participants. The data record can include information, such a transaction description (e.g., transaction date, sender address, destination address, transaction amount), entity information (e.g., entity name, wallet address, etc.), among other information, such as smart contracts associated with the blockchain transaction. The T-Node module 504 can store such blockchain data in the data store 530.

The blockchain module 506 can be configured to manage a blockchain based on a blockchain protocol. In general, the blockchain module 506 can implement generally known blockchain protocols. A blockchain protocol can define a set of rules for managing a blockchain associated with a blockchain network. For example, the blockchain module 506 can implement a blockchain protocol that facilitates transactions based on cryptocurrency (e.g., tokens, coins, stablecoins). The blockchain may be configured to store a plurality of data records using a suitable data storage format and schema. The blockchain may be formatted based on generally known approaches. For example, the blockchain can be stored as a relational database that utilizes structured query language to process structured data sets stored therein. Each data record stored in the blockchain can be associated with a transaction and include blockchain data associated therewith, such as a transaction description (e.g., transaction date, sender address, destination address, transaction amount), entity information (e.g., entity name, wallet address, etc.), among other information as known to persons having skill in the relevant art. As an example, the blockchain can be used to record transactions occurring in a supply chain associated with a first entity (e.g., Company A). In such embodiments, the blockchain can be managed based on a blockchain protocol associated with the first entity. Further, the transactions can be based on cryptocurrency that is managed (e.g., minted, burned) by the first entity.

The blockchain module 506 can be configured to query the blockchain, for example, for transaction details based on terms associated with a search query. For example, the blockchain module 506 can execute queries to retrieve (or identify) blockchain data representing various transactions based on various search criteria. In some embodiments, the blockchain module 506 can restrict which entities are permitted to submit such queries. For example, in some embodiments, only a top-level company associated with a blockchain-based supply chain payment network is permitted to query the blockchain for transactions. In some embodiments, selected parties or upstream suppliers in a supply chain associated with a blockchain-based supply chain payment network are permitted to query the blockchain for transactions. In some embodiments, all or selected network participants can query the blockchain to view transactions that occur downstream. In some embodiments, information provided in response to queries can be restricted based on various privacy considerations. Many variations are possible.

The blockchain module 506 can be configured to generate data records to be stored in the blockchain. The data record may be a data record suitable for inclusion in the blockchain and include data suitable for use in validation of a given transaction. The included data may comprise transaction data values. In some embodiments, one or more of the transaction data values included in the generated data record may be hashed and/or encrypted using one or more suitable hashing and encryption algorithms, respectively.

The blockchain module 506 can update the blockchain based on generated data records. For example, the blockchain module 506 can determine that a new transaction has occurred. In this example, the blockchain module 506 can execute a query to update the blockchain to add a data record associated with the new transaction. In some instances, the blockchain may be stored locally, such as a blockchain stored in the data store 530. In other instances, the blockchain may be associated with a blockchain network. In such instances, when the blockchain is updated with a generated data record, the generated data record can be submitted to the blockchain network and/or one or more nodes associated with the blockchain network for validation and posting to the blockchain. In some embodiments, the blockchain module 506 can provide (or broadcast) a notification, for example, to other modules of the T-Node module 504 or nodes in the blockchain network, once the blockchain is updated.

The blockchain module 506 can be configured to verify (or validate) data records to be stored in the blockchain. For example, the blockchain module 506 may receive a data record to be added to a blockchain. The data record can describe a transaction. The blockchain module 506 may be configured to validate the data record using one or more suitable methods, such as a proof of work method associated with the corresponding blockchain including, for example, proof of stake calculations and confirmations, proof of authority calculations and confirmations, proof of history calculations and confirmations, proof of two calculations and confirmations, and proof of N calculations and confirmations, to name some examples. The blockchain module 506 can also output an indication of success or failure for the validation. For example, if the validation of the data record is successful, the blockchain module 506 may indicate that validation of the data record was completed successfully. As a result, the data record can be added to the blockchain and propagated to nodes of a corresponding blockchain network. The blockchain module 506 can also send a notification to the corresponding blockchain network and/or one or more nodes in the corresponding blockchain network to indicate the successful validation of the data record. Many variations are possible.

The blockchain module 506 can be configured to electronically transmit data to the blockchain network for posting new blockchain transactions to the blockchain. In some embodiments, the blockchain module 506 can electronically transmit data to different blockchain networks. In such embodiments, the blockchain module 506 can identify a blockchain network to which data is to be transmitted based on a network identifier associated with the blockchain network as provided in blockchain data (e.g., data records). In some embodiments, the blockchain module 506 can also be configured to transmit validation data to the blockchain network and to nodes associated with the blockchain network. For example, the validation data can be transmitted for data records newly added to the blockchain associated with the blockchain network.

In some embodiments, the blockchain module 506 can be configured to manage a unified blockchain associated with a blockchain network, as illustrated in the example of FIG. 2A. The unified blockchain can be used to record transactions that occur in different blockchain-based supply chain payment networks. That is, the unified blockchain supports transactions based on different types of payment tokens that are minted for circulation in different blockchain-based supply chain payment networks. For example, the blockchain can be used to record transactions that occur in a first blockchain-based supply chain payment network associated with Company A and a second blockchain-based supply chain payment network associated with Company B. For example, the blockchain can support transactions that involve payments based on payment tokens minted by Company A (e.g., the I-Nodes 202) and transactions that involve payments based on payment tokens minted by Company B (e.g., the I-Nodes 222). In some embodiments, the unified blockchain associated with the blockchain network can be a "private" blockchain that is restricted to Company A and/or Company B, and their suppliers. In some embodiments, the nodes of the blockchain network can be configured to post blockchain transactions to the unified blockchain. The nodes can also be configured to validate transactions posted to the unified blockchain. In general, transactions posted to the unified blockchain can be validated using generally known techniques including, for example, proof of work calculations and confirmations, proof of stake calculations and confirmations, proof of authority calculations and confirmations, proof of history calculations and confirmations, proof of two calculations and confirmations, and proof of N calculations and confirmations, to name some examples. In some embodiments, the unified blockchain is hosted by a blockchain-based supply chain network. In such embodiments, the unified blockchain can be managed exclusively by the blockchain-based supply chain network. For example, in such embodiments, the T-Node module 504 can be implemented in one or more compute nodes that are managed by the network.

The virtualization module 508 can be configured to initialize (or launch) virtual machines that can serve as virtual nodes in a blockchain-based supply chain payment network, as illustrated in the example of FIG. 3A. For example, a hosted blockchain network can include a plurality of computing systems. The hosted blockchain network can support multiple blockchains associated with different blockchain-based supply chain payment networks. For example, the hosted blockchain network can host a first blockchain-based supply chain payment network associated with Company A and a second blockchain-based supply chain payment network associated with Company B. In this example, the virtualization module 508 can launch a first virtual machine that hosts a blockchain associated with the first blockchain-based supply chain payment network. In some embodiments, the first virtual machine can perform operations to manage the first blockchain-based supply chain payment network based on functionality associated with the T-Node module 504. For example, the first virtual machine can manage the blockchain associated with the first blockchain-based supply chain payment network, as described herein. Similarly, the virtualization module 508 can launch a second virtual machine that hosts a blockchain associated with the second blockchain-based supply chain payment network. In some embodiments, the second virtual machine can perform operations to manage the second blockchain-based supply chain payment network based on functionality associated with the T-Node module 504. For example, the second virtual machine can manage the blockchain associated with the second blockchain-based supply chain payment network, as described herein. In various embodiments, the virtualization module 508 can dynamically add and remove virtual machines tasked with hosting a new blockchain-based supply chain payment network as needed. For example, the virtualization module 508 can launch additional virtual machines on additional computing systems to support the blockchain associated with the first blockchain-based supply chain payment network. The virtualization module 508 can also deactivate virtual machines that support the blockchain associated with the first blockchain-based supply chain payment network as needed. Similarly, the virtualization module 508 can launch additional virtual machines on additional computing systems to support the blockchain associated with the second blockchain-based supply chain payment network. The virtualization module 508 can also deactivate virtual machines that support the blockchain associated with the second blockchain-based supply chain payment network as needed. Many variations are possible.

The wallet module 510 can be configured to manage one or more digital wallets associated with a given entity (e.g., company). The digital wallets can be implemented using generally known approaches for storing and managing payment tokens. For example, in various embodiments, the wallet module 510 can provide options to send tokens to other entities in a blockchain network and receive tokens from other entities in the blockchain network. In some embodiments, the wallet module 510 provides an option to redeem (or cash out) tokens stored in a digital wallet for fiat or digital currency. For example, an entity can interact with the wallet module 510 to request that some amount of tokens be converted to fiat or digital currency. In this example, the wallet module 510 can determine an amount of fiat or digital currency to be withdrawn from an account at a financial institution based on the amount of tokens to be converted. The wallet module 510 can provide a request to withdraw the amount of fiat or digital currency from the account to a computing system associated with the financial institution. The converted tokens can be burned as part of the withdrawal. In some embodiments, the wallet module 510 can be implemented as a software application that can run on computing devices. Many variations are possible. For example, in some embodiments, the wallet module 510 can provide a request to withdraw the amount of fiat or digital currency to a computing system associated with a blockchain-based supply chain network. In such embodiments, the platform can facilitate the exchange of cryptocurrency tokens to fiat or digital currency. In some embodiments, the wallet module 510 can be implemented as a software application that can run on computing devices. In some embodiments, the wallet module 510 can implement a multi-token digital wallet that is capable of managing cryptocurrency tokens associated with different blockchain-based supply chain payment networks.

The application module 512 can be configured to use blockchain data for various applications. For example, in some embodiments, the application module 512 can create and evaluate smart contracts based on generally known approaches. A smart contract can involve transactions involving multiple entities in a blockchain network. The application module 512 can provide various options to construct and evaluate smart contracts. For example, a smart contract can be written as computer code that is committed to a blockchain. The smart contract can be associated with conditions. When an event described in the smart contract is triggered, the computer code associated with the smart contract can execute. As an example, a smart contract may be created between a company and a supplier. The smart contract can be associated with a condition that requires the supplier to ship supplies to effectuate a payment by the company. In this example, when the supplies are shipped, the payment can automatically be transferred from a digital wallet associated with the company to a digital wallet associated with the supplier. Many variations are possible.

In some embodiments, the application module 512 can be configured to generate supply chain reports based on data records stored in the blockchain. For example, the application module 512 can query the blockchain to identify transactions associated with a supply chain network. The identified transactions can be used to generate a report that identifies various transaction information, such as transaction descriptions (e.g., transaction date, sender address, destination address, transaction amount) and entity information (e.g., entity name, wallet address, etc.), which can be redacted (or restricted) based on various privacy restrictions, such as entity name, transaction amount, and transaction timing, to name some examples. The report can thus identify cryptocurrency token payments made from one entity to another entity in the supply chain. In such embodiments, a company associated with the supply chain network can readily identify suppliers in its supply chain across different tiers based on transactions conducted by those suppliers and related payments based on payment tokens. In some embodiments, the application module 512 can evaluate such supply chain reports for compliance purposes. For example, the application module 512 can evaluate a supply chain report to identify non-compliant suppliers based on a pre-defined list of non-compliant suppliers. For example, based on an evaluation of the supply chain report, the application module 512 can identify a supplier that has previously been cited for labor-related issues. As mentioned, in some embodiments, the blockchain can be a unified blockchain that can be used to record transactions that occur in different blockchain-based supply chain payment networks. For example, the unified blockchain can manage transactions that occur in a first blockchain-based supply chain payment network and a second blockchain-based supply chain payment network. In such embodiments, the application module 512 can generate separate supply chain reports for the different blockchain-based supply chain payment networks. For example, a first supply chain report can be generated based on transactions that occur in the first blockchain-based supply chain payment network. Similarly, a second supply chain report can be generated based on transactions that occur in the second blockchain-based supply chain payment network.

Figure 6:
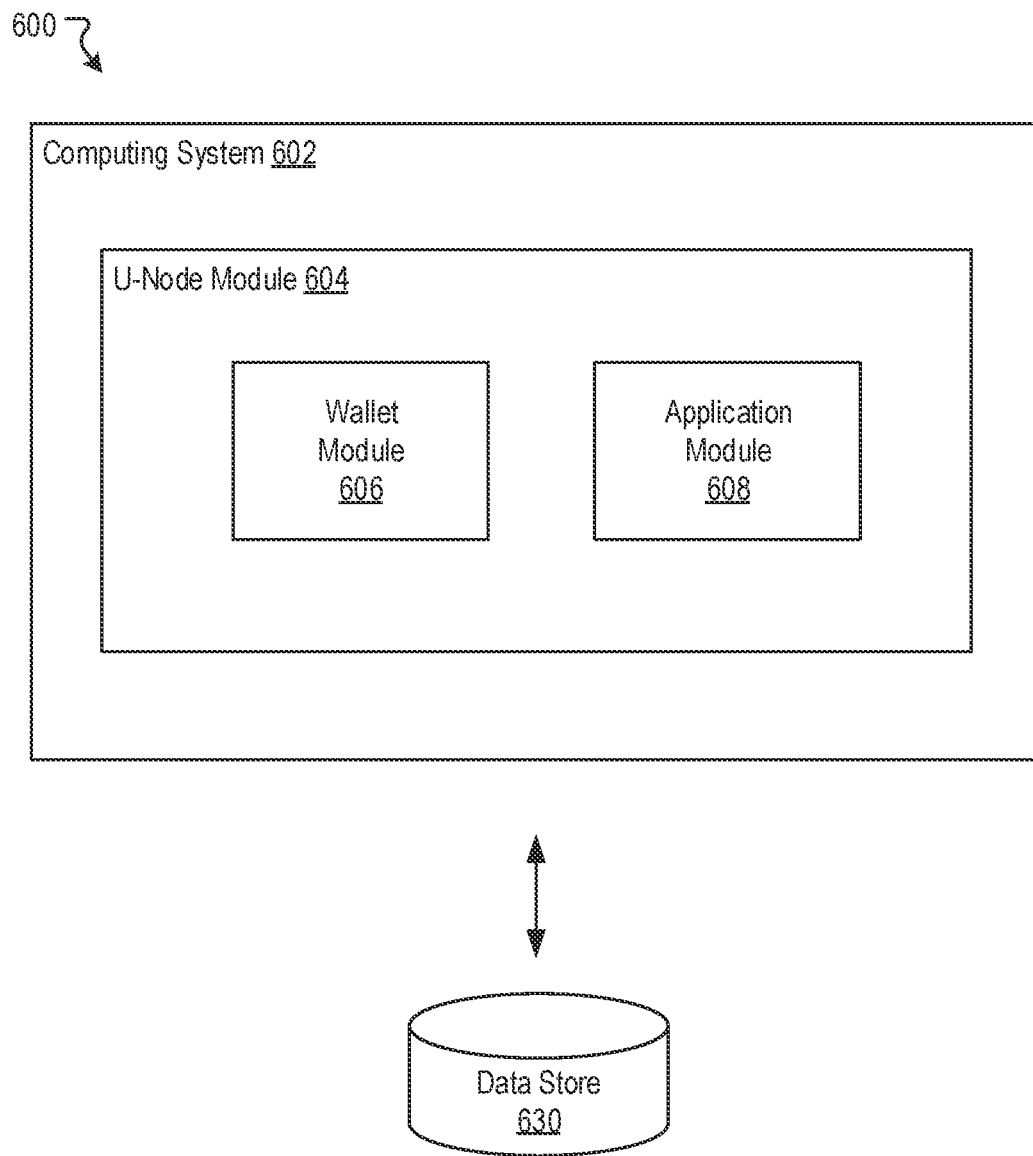
FIG. 6 illustrates an example computing system implementing a U-Node module, in accordance with various embodiments of the present technology.

FIG. 6 illustrates an example environment 600, in accordance with various embodiments. The example environment 600 can include at least a computing system 602. The computing system 602 can include one or more processors and memory among other components, as described in reference to FIG. 8. The processors can be configured to perform various operations by interpreting machine-readable instructions. The computing system 602 can include a U-Node module 604. The U-Node module 604 can include a wallet module 606 and an application module 608. The wallet module 606 and application module 608 can be executed by the processor(s) of the computing system 602 to perform various operations, as described below. In some embodiments, the U-Node module 604 can be implemented, in whole or in part, as software that is capable of running on one or more computing systems or devices. In some embodiments, the U-Node module 604 can be implemented, in whole or in part, as software that is capable of running on one or more servers (e.g., cloud servers).

Further, the computing system 602 can access a data store 630. In general, a data store may be any device in which data can be stored and from which data can be retrieved. In some embodiments, the data store 630 may store and manage various data, such as blockchain data, information describing blockchain protocols, encryption keys and algorithms, communication protocols and standards, data formatting standards and protocols, program code for modules and application programs of the processing device, and other data that may be suitable for use by the U-Node module 604 to perform the functions disclosed herein. The computing system 602 and the data store 630 may be accessible either directly or over a computer network. The computer network may be any wired or wireless network through which data can be sent and received (e.g., the Internet, local area network, etc.).

The U-Node module 604 can interact with the computing system 602 to receive data over one or more networks based on one or more network protocols. For example, the U-Node module 604 can be configured to exchange data (e.g., receive data, send data) with other I-Nodes, T-Nodes, U-Nodes, financial institutions, blockchain networks, and other entities over computer networks, such as the Internet. The U-Node module 604 can also be configured to receive blockchain data, for example, from other I-Nodes, T-Nodes, and blockchain networks. The blockchain data may comprise a blockchain and associated data records included in the blockchain. For example, a blockchain data record can describe a blockchain transaction between network participants. The data record can include information, such a transaction description (e.g., transaction date, sender address, destination address, transaction amount), entity information (e.g., entity name, wallet address, etc.), among other information, such as smart contracts associated with the blockchain transaction. The U-Node module 604 can store such blockchain data in the data store 630.

The wallet module 606 can be configured to manage one or more digital wallets associated with a given entity (e.g., company). The digital wallets can be implemented using generally known approaches for storing and managing cryptocurrency and payment tokens. For example, in various embodiments, the wallet module 606 can provide options to send tokens to other entities in a blockchain network and receive tokens from other entities in the blockchain network. In some embodiments, the wallet module 606 provides an option to redeem (or cash out) tokens stored in a digital wallet for fiat or digital currency. For example, an entity can interact with the wallet module 606 to request that some amount of tokens be converted to fiat or digital currency. In this example, the wallet module 606 can determine an amount of fiat or digital currency to be withdrawn from an account at a financial institution based on the amount of tokens to be converted. The wallet module 606 can provide a request to withdraw the amount of fiat or digital currency from the account to a computing system associated with the financial institution. The converted tokens can be burned as part of the withdrawal. Many variations are possible. For example, in some embodiments, the wallet module 606 can provide a request to withdraw the amount of fiat or digital currency to a computing system associated with a blockchain-based supply chain network. In such embodiments, the platform can facilitate the exchange of cryptocurrency tokens to fiat or digital currency. In some embodiments, the wallet module 606 can be implemented as a software application that can run on computing devices. In some embodiments, the wallet module 606 can implement a multi-token digital wallet that is capable of managing cryptocurrency tokens associated with different blockchain-based supply chain payment networks.

The application module 608 can be configured to use blockchain data for various applications. For example, in some embodiments, the application module 608 can create and evaluate smart contracts based on generally known approaches. A smart contract can involve transactions involving multiple entities in a blockchain network. The application module 608 can provide various options to construct and evaluate smart contracts. For example, a smart contract can be written as computer code that is committed to a blockchain. The smart contract can be associated with conditions. When an event described in the smart contract is triggered, the computer code associated with the smart contract can execute. As an example, a smart contract may be created between a company and a supplier. The smart contract can be associated with a condition that requires the supplier to ship supplies to effectuate a payment by the company. In this example, when the supplies are shipped, the payment can automatically be transferred from a digital wallet associated with the company to a digital wallet associated with the supplier. Many variations are possible.

Figure 7A:
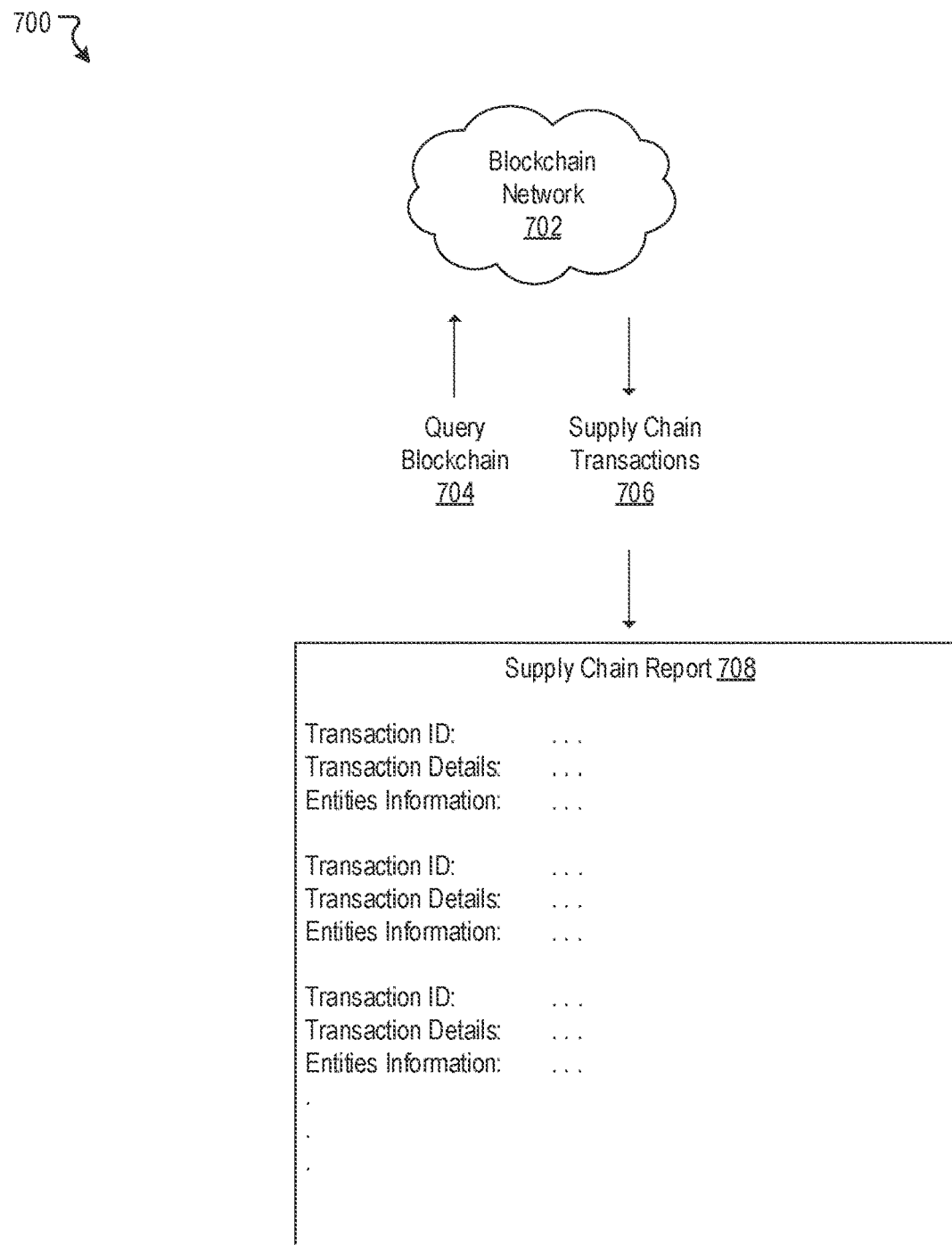
FIG. 7A illustrates an example diagram for generating a supply chain report, in accordance with various embodiments of the present technology.

FIG. 7A illustrates an example diagram 700 for generating a supply chain report, in accordance with various embodiments of the present technology. In the example of FIG. 7A, a blockchain associated with a blockchain network 702 can be queried 704. The blockchain network 702 can comprise nodes associated with a blockchain-based supply chain payment network. A set of supply chain transactions 706 responsive to the query 704 can be obtained. The set of supply chain transactions 706 can describe various transactions that occurred between participants in the blockchain-based supply chain payment network. A supply chain report 708 can be generated based on the set of supply chain transactions 706. The supply chain report 708 can detail transactions that occurred between participants in the blockchain-based supply chain payment network, as described above. For example, the supply chain report 708 can identify network participants that received, sent, or redeemed payment tokens minted for circulation in the blockchain-based supply chain payment network. Many variations are possible.

Figure 7B:
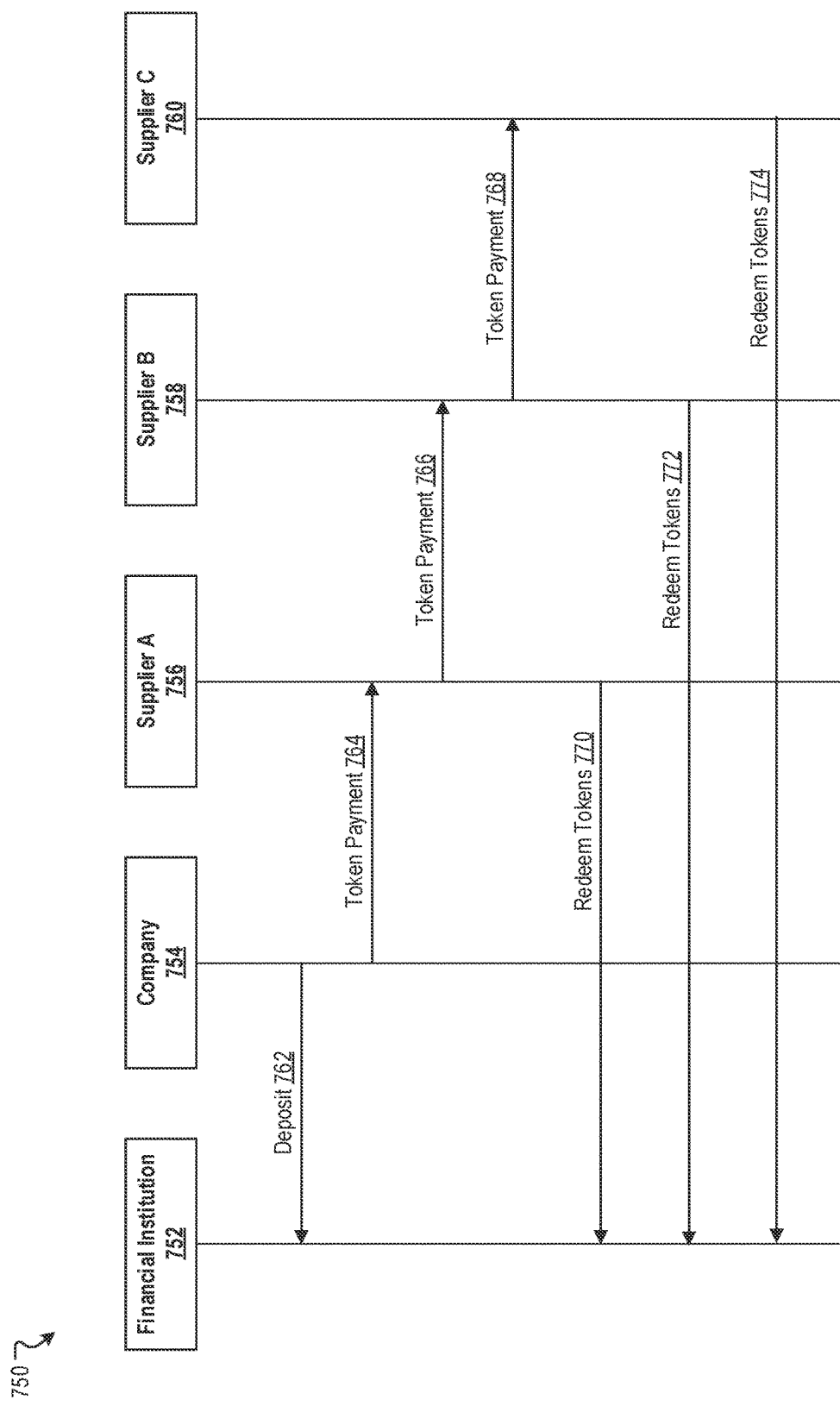
FIG. 7B illustrates an example sequence diagram, in accordance with various embodiments of the present technology.

FIG. 7B illustrates an example sequence diagram 750, in accordance with various embodiments of the present technology. The example sequence diagram 750 illustrates an example set of interactions (or transactions) between a Financial Institution 752, a Company 754, a Supplier A 756, a Supplier B 758, and a Supplier C 760 through a blockchain-based supply chain payment network in accordance with various embodiments of the present technology. It should be appreciated that there can be additional, fewer, or alternative steps performed in similar or alternative orders, or in parallel, within the scope of the various embodiments unless otherwise stated.

For example, the Company 754 can mint cryptocurrency (or payment tokens) that can be used to conduct transactions within the blockchain-based supply chain payment network. The tokens can be pegged to fiat or digital currency that is deposited partially or fully in an account associated with the Company 754 through the Financial Institution 752. For example, at step 762, some amount of fiat currency to which the tokens are pegged can be deposited in full or in part, for example, based on a redeemable fiat currency requirement. The Company 754 can mint payment tokens based on the deposited fiat currency. In this example, the Company 754 can initiate payments to its tiered suppliers based on the minted payment tokens. These payment transactions can be recorded in a blockchain associated with the blockchain-based supply chain payment network, as described herein. At step 764, the Company 754 makes a payment to Supplier A 756 in the amount of 100 tokens. For example, Supplier A 756 can be a Tier 1 supplier for the Company 754. At step 766, Supplier A 756 makes a payment to Supplier B 758 in the amount of 80 tokens. For example, Supplier B 758 can be a Tier 2 supplier for the Company 754. At step 768, Supplier B 758 makes a payment to Supplier C 760 in the amount of 50 tokens. For example, Supplier C 760 can be a Tier 3 supplier for the Company 754.

At step 770, Supplier A 756 redeems 20 tokens in exchange for fiat or digital currency. For example, the Company 754 can receive the 20 tokens and in response provide an instruction to the Financial Institution 752 to provide Supplier A 756 with fiat or digital currency based on the redeemed 20 tokens. The fiat or digital currency can be withdrawn from the account associated with Company 754 at the Financial Institution 752. At step 772, Supplier B 758 redeems 30 tokens in exchange for fiat or digital currency. For example, the Company 754 can receive the 30 tokens and in response provide an instruction to the Financial Institution 752 to provide Supplier B 758 with fiat or digital currency based on the redeemed 30 tokens. The fiat or digital currency can be withdrawn from the account associated with Company 754 at the Financial Institution 752. At step 774, Supplier C 760 redeems 50 tokens in exchange for fiat or digital currency. For example, the Company 754 can receive the 50 tokens and in response provide an instruction to the Financial Institution 752 to provide Supplier C 760 with fiat or digital currency based on the redeemed 50 tokens. The fiat or digital currency can be withdrawn from the account associated with Company 754 at the Financial Institution 752.

In various embodiments, network participants can trace transaction payments with privacy restrictions, as described herein. In the example of FIG. 7B, the Company 754 can access transaction details for payment tokens used in downstream transactions, such as the token payment 766 and the token payment 768. Similarly, Supplier A 756 can access transaction details for payment tokens used in downstream transactions, such as the payment token 768. Many variations are possible.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
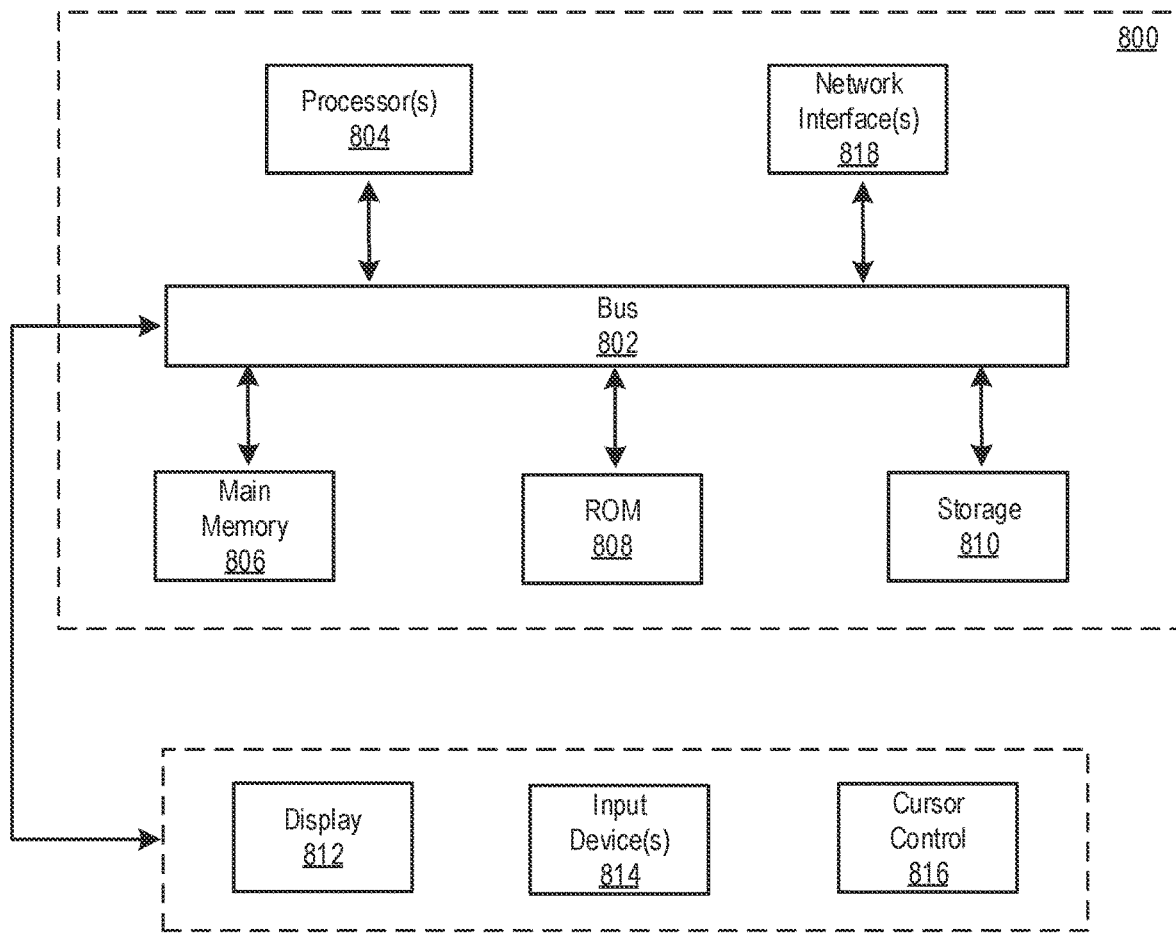
FIG. 8 illustrates a block diagram of an example computer system in which any of the embodiments described herein may be implemented.

FIG. 8 is a block diagram that illustrates a computer system 800 upon which any of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, Python, or GoLang. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components (or modules), operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components (or modules) in example configurations may be implemented as a combined structure or component. Similarly, structures and functionality presented as a single component (or module) may be implemented as separate components (or modules). These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for managing supply chain payment transactions in a supply chain payment network of a company based on a blockchain network, the method comprising:

obtaining, by an I-node in the blockchain network, payment tokens to conduct transactions within the supply chain payment network of the company, the I-node participates as a node in the blockchain network that is managed by the company and includes at least one processor and memory, the payment tokens are pegged to fiat currency or digital currency, and the payment tokens are company-specific tokens that are circulated in the supply chain payment network of the company;

determining, by the I-node, a payment from a digital wallet associated with the I-node to a digital wallet associated with a U-node in the blockchain network, the U-node is managed by a supplier in the supply chain payment network of the company and includes at least one processor and memory, and the payment is based on the payment tokens that are company-specific tokens circulated in the supply chain payment network of the company;

providing, by the I-node, a data record to a T-node in the blockchain network, the data record describes the payment from the digital wallet associated with the I-node to the digital wallet associated with the U-node, the T-node participates as a node in the blockchain network and includes at least one processor and memory, and the T-node posts the data record to a blockchain associated with the blockchain network;

determining, by the I-node, a plurality of suppliers included in the supply chain payment network of the company based on a plurality of payments made among the I-node and respective U-nodes associated with the plurality of suppliers, the plurality of suppliers including the supplier in the supply chain payment network of the company, the plurality of payments being based on payment tokens minted for circulation in the supply chain payment network of the company, and the plurality of payments including the payment from the digital wallet associated with the I-node to the digital wallet associated with the U-node in the blockchain network; and determining, by the I-node, whether any suppliers included in the supply chain payment network of the company are non-compliant based at least in part on a comparison of the plurality of suppliers and a predefined list of non-compliant suppliers.

2. The computer-implemented method of claim 1, further comprising:

determining, by the I-node, a request from the U-node associated with the supplier to convert one or more payment tokens to an amount in fiat currency or digital currency; and providing, by the I-node, an instruction to a computing system associated with a financial institution to initiate a fiat currency or digital currency payment transaction to a bank account associated with the supplier based on conversion of the one or more payment tokens to the amount in fiat currency or digital currency.

3. The computer-implemented method of claim 2, further comprising:

determining, by the I-node, a request from a different U-node associated with a different supplier to convert at least one payment token to an amount in fiat currency or digital currency, the at least one payment token having been received from the digital wallet associated with the U-node; and providing, by the I-node, an instruction to a financial institution to initiate a fiat currency or digital currency payment transaction to a bank account associated with the different supplier based on conversion of the at least one payment token to the amount in fiat currency or digital currency.

4. The computer-implemented method of claim 1, further comprising:

generating, by the I-node, a supply chain report based on one or more queries to the blockchain associated with the blockchain network, the supply chain report includes transaction information for at least the data record describing the payment from the digital wallet associated with the I-node to the digital wallet associated with the U-node and one or more data records describing payments between other suppliers.

5. The computer-implemented method of claim 4, further comprising:

determining, by the I-node, one or more network participants involved in at least one transaction in the supply chain payment network of the company that were previously cited for labor-related issues.

6. The computer-implemented method of claim 1, wherein the payment is determined based on a smart contract.

7. The computer-implemented method of claim 6, wherein the payment is provided automatically in response to satisfaction of a set of conditions associated with the smart contract.

8. The computer-implemented method of claim 1, wherein the blockchain network comprises a plurality of T-nodes that are managed by the company and different suppliers for the company.

9. The computer-implemented method of claim 1, wherein the blockchain is a distributed database that includes a plurality of data records that each represent a transaction in the supply chain payment network of the company.

10. The computer-implemented method of claim 9, wherein the transactions are between the company and one or more suppliers in the supply chain payment network of the company or between a first supplier in a tier of the supply chain payment network of the company that is upstream to a second supplier in a lower tier of the supply chain payment network of the company.

11. The computer-implemented method of claim 1, wherein the T-node is also a node in a different blockchain network associated with a supply chain payment network of a different company.

12. The computer-implemented method of claim 1, further comprising:

determining, by the I-node, one or more additional T-Nodes added to the blockchain network by a third supplier, or determining, by the I-node, one or more T-Nodes removed by the third supplier from the blockchain network.

13. The computer-implemented method of claim 1, wherein the digital wallet associated with the U-node manages payment tokens that are company-specific tokens circulated in the supply chain payment network of the company and payment tokens that are company-specific tokens circulated in a different supply chain payment network of a different company.

14. The computer-implemented method of claim 1, further comprising:

tracing, by the I-node, transactions that occur between the company and one or more suppliers through the supply chain payment network of the company based on data records posted in the blockchain and one or more privacy restrictions, or tracing, by the I-node, transactions that occur between a first supplier in a given tier of the supply chain payment network of the company that is upstream to a second supplier in a lower tier of the supply chain payment network of the company.

15. An I-node for managing supply chain payment transactions in a supply chain payment network of a company based on a blockchain network, comprising:

at least one processor; and a memory storing instructions that, when executed by the at least one processor, cause the I-node to perform operations comprising:

obtaining payment tokens to conduct transactions within the supply chain payment network of the company, the I-node participates as a node in the blockchain network that is managed by the company and includes at least one processor and memory, the payment tokens are pegged to fiat currency or digital currency, and the payment tokens are company-specific tokens that are circulated in the supply chain payment network of the company;

determining a payment from a digital wallet associated with the I-node to a digital wallet associated with a U-node in the blockchain network, the U-node is managed by a supplier in the supply chain payment network of the company and includes at least one processor and memory, and the payment is based on the payment tokens that are company-specific tokens circulated in the supply chain payment network of the company;

providing a data record to a T-node in the blockchain network, the data record describes the payment from the digital wallet associated with the I-node to the digital wallet associated with the U-node, the T-node participates as a node in the blockchain network and includes at least one processor and memory, and the T-node posts the data record to a blockchain associated with the blockchain network;

determining a plurality of suppliers included in the supply chain payment network of the company based on a plurality of payments made among the I-node and respective U-nodes associated with the plurality of suppliers, the plurality of suppliers including the supplier in the supply chain payment network of the company, the plurality of payments being based on payment tokens minted for circulation in the supply chain payment network of the company, and the plurality of payments including the payment from the digital wallet associated with the I-node to the digital wallet associated with the U-node in the blockchain network; and determining whether any suppliers included in the supply chain payment network of the company are non-compliant based at least in part on a comparison of the plurality of suppliers and a pre-defined list of non-compliant suppliers.

16. The I-node of claim 15, wherein the instructions further cause the I-node to perform operations comprising:
determining a request from the U-node associated with the supplier to convert one or more payment tokens to an amount in fiat currency or digital currency; and
providing an instruction to a computing system associated with a financial institution to initiate a fiat currency or digital currency payment transaction to a bank account associated with the supplier based on conversion of the one or more payment tokens to the amount in fiat currency or digital currency.

17. The I-node of claim 16, wherein the instructions further cause the I-node to perform operations comprising:
determining a request from a different U-node associated with a different supplier to convert at least one payment token to an amount in fiat currency or digital currency, the at least one payment token having been received from the digital wallet associated with the U-node; and
providing an instruction to a financial institution to initiate a fiat currency or digital currency payment transaction to a bank account associated with the different supplier based on conversion of the at least one payment token to the amount in fiat currency or digital currency.

18. The I-node of claim 15, wherein the instructions further cause the I-node to perform operations comprising:
generating a supply chain report based on one or more queries to the blockchain associated with the blockchain network, the supply chain report includes transaction information for at least the data record describing the payment from the digital wallet associated with the I-node to the digital wallet associated with the U-node and one or more data records describing payments between other suppliers.

19. The I-node of claim 18, wherein the instructions further cause the I-node to perform operations comprising:
determining one or more network participants involved in at least one transaction in the supply chain payment network of the company that were previously cited for labor-related issues.

20. The I-node of claim 15, wherein the blockchain network comprises a plurality of T-nodes that are managed by the company and different suppliers for the company.

21. The I-node of claim 20, wherein the instructions further cause the I-node to perform operations comprising:
determining one or more additional T-Nodes added to the blockchain network by a third supplier, or
determining one or more T-Nodes removed by the third supplier from the blockchain network.

22. The I-node of claim 15, wherein the digital wallet associated with the U-node manages payment tokens that are company-specific tokens circulated in the supply chain payment network of the company and payment tokens that are company-specific tokens circulated in a different supply chain payment network of a different company.

23. The I-node of claim 15, wherein the instructions further cause the I-node to perform:
tracing transactions that occur between the company and one or more suppliers through the supply chain payment network of the company based on data records posted in the blockchain and one or more privacy restrictions, or
tracing transactions that occur between a first supplier in a given tier of the supply chain payment network of the company that is upstream to a second supplier in a lower tier of the supply chain payment network of the company.

24. A non-transitory computer-readable storage medium including instructions that, when executed by at least one processor of an I-node, cause the I-node to perform operations comprising:
obtaining payment tokens to conduct transactions within the supply chain payment network of the company, the I-node participates as a node in the blockchain network that is managed by the company and includes at least one processor and memory, the payment tokens are pegged to fiat currency or digital currency, and the payment tokens are company-specific tokens that are circulated in the supply chain payment network of the company;
determining a payment from a digital wallet associated with the I-node to a digital wallet associated with a U-node in the blockchain network, the U-node is managed by a supplier in the supply chain payment network of the company and includes at least one processor and memory, and the payment is based on the payment tokens that are company-specific tokens circulated in the supply chain payment network of the company;
providing a data record to a T-node in the blockchain network, the data record describes the payment from the digital wallet associated with the I-node to the digital wallet associated with the U-node, the T-node participates as a node in the blockchain network and includes at least one processor and memory, and the T-node posts the data record to a blockchain associated with the blockchain network;
determining a plurality of suppliers included in the supply chain payment network of the company based on a plurality of payments made among the I-node and respective U-nodes associated with the plurality of suppliers, the plurality of suppliers including the supplier in the supply chain payment network of the company, the plurality of payments being based on payment tokens minted for circulation in the supply chain payment network of the company, and the plurality of payments including the payment from the digital wallet associated with the I-node to the digital wallet associated with the U-node in the blockchain network; and determining whether any suppliers included in the supply chain payment network of the company are non-compliant based at least in part on a comparison of the plurality of suppliers and a pre-defined list of non-compliant suppliers.

25. The non-transitory computer-readable storage medium of claim 24, wherein the instructions further cause the I-node to perform operations comprising:

determining a request from the U-node associated with the supplier to convert one or more payment tokens to an amount in fiat currency or digital currency; and providing an instruction to a computing system associated with a financial institution to initiate a fiat currency or digital currency payment transaction to a bank account associated with the supplier based on conversion of the one or more payment tokens to the amount in fiat currency or digital currency.

26. The non-transitory computer-readable storage medium of claim 25, wherein the instructions further cause the I-node to perform operations comprising:

determining a request from a different U-node associated with a different supplier to convert at least one payment token to an amount in fiat currency or digital currency, the at least one payment token having been received from the digital wallet associated with the U-node; and providing an instruction to a financial institution to initiate a fiat currency or digital currency payment transaction to a bank account associated with the different supplier based on conversion of the at least one payment token to the amount in fiat currency or digital currency.

27. The non-transitory computer-readable storage medium of claim 24, wherein the instructions further cause the I-node to perform operations comprising:

generating a supply chain report based on one or more queries to the blockchain associated with the blockchain network, the supply chain report includes transaction information for the data record describing the payment from the digital wallet associated with the I-node to the digital wallet associated with the U-node and one or more data records describing payments between other suppliers.

28. The non-transitory computer-readable storage medium of claim 27, wherein the instructions further cause the I-node to perform operations comprising:

determining one or more network participants involved in at least one transaction in the supply chain payment network of the company that were previously cited for labor-related issues.

29. The non-transitory computer-readable storage medium of claim 24, wherein the blockchain network comprises a plurality of T-nodes that are managed by the company_and different suppliers for the company.

30. The non-transitory computer-readable storage medium of claim 24, wherein the instructions further cause the I-node to perform operations comprising:

determining one or more additional T-Nodes added to the blockchain network by a third supplier, or determining one or more T-Nodes removed by the third supplier from the blockchain network.

* * * * *